US012656186B2

(12) United States Patent
Horng et al.

(10) Patent No.:  US 12,656,186 B2
(45) Date of Patent:      Jun. 16, 2026

(54) LOW TEMPERATURE ERROR THERMAL SENSOR

(71) Applicant: Taiwan Semiconductor Manufacturing Company, Ltd., Hsinchu (TW)

(72) Inventors: Jaw-Juinn Horng, Hsinchu (TW); Szu-Lin Liu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 853 days.

(21) Appl. No.: 17/874,476

(22) Filed: Jul. 27, 2022

(65) Prior Publication Data

US 2022/0364936 A1      Nov. 17, 2022

Related U.S. Application Data

(63) Continuation of application No. 16/571,914, filed on Sep. 16, 2019, now Pat. No. 11,493,389.

(Continued)

(51) Int. Cl.
*G01K 15/00*       (2006.01)
*G01K 7/01*       (2006.01)
(Continued)

(52) U.S. Cl.
CPC .................. *G01K 7/18* (2013.01); *G01K 7/01* (2013.01); *G01K 15/002* (2013.01);
(Continued)

(58) Field of Classification Search
CPC .......... G01K 7/18; G01K 7/01; G01K 15/002; G01K 15/005; G01K 17/00; G01K 7/00; G01K 15/00
See application file for complete search history.

(56) References Cited

U.S. PATENT DOCUMENTS 5,982,221 A * 11/1999 Tuthill ..................... G01K 7/01
                                                                   327/512
6,225,851 B1 * 5/2001 Descombes .............. G01K 7/01
                                                                   374/170

(Continued)

FOREIGN PATENT DOCUMENTS

CN        101738262 A       6/2010
CN        101871820 A      10/2010

(Continued)

OTHER PUBLICATIONS

Ledvina et al., "Single BJT based temperature measurement circuit without MIMC and calibration," Analog Integr. Circ. Sig. Process, vol. 91, pp. 111-118 (2017).

(Continued)

*Primary Examiner* — Laura Martin
*Assistant Examiner* — Philip L Cotey
(74) *Attorney, Agent, or Firm* — Merchant & Gould P.C.

(57) ABSTRACT

A thermal sensor in some embodiments comprises two temperature-sensitive branches, each including a thermal-sensing device, such as one or more bipolar-junction transistors, and a current source for generating a current density in the thermal-sensing device to generate a temperature-dependent signal. The thermal sensor further includes a signal processor configured to multiply the temperature-dependent signal from the branches by respective and different gain factors, and combine the resultant signals to generate an output signal that is substantially proportional to the absolute temperature the thermal sensor is disposed at.

12 Claims, 16 Drawing Sheets

Related U.S. Application Data

(60) Provisional application No. 62/738,292, filed on Sep. 28, 2018.

(51) Int. Cl.

| | |
|---|---|
| G01K 7/18 | (2006.01) |
| G01K 17/00 | (2006.01) |
| *G01K 7/00* | (2006.01) |

(52) U.S. Cl.

CPC .......... *G01K 15/005* (2013.01); *G01K 17/00* (2013.01); *G01K 7/00* (2013.01); *G01K 15/00* (2013.01)

(56) References Cited

U.S. PATENT DOCUMENTS

| | | | | | |
|---|---|---|---|---|---|
| 7,122,998 | B2 * | 10/2006 | Chen | | G05F 3/30 |
| | | | | | 323/907 |
| 8,217,708 | B2 * | 7/2012 | Yoshikawa | | G01K 7/01 |
| | | | | | 374/173 |
| 8,915,646 | B2 * | 12/2014 | Wei | | G01K 7/34 |
| | | | | | 374/178 |
| 9,506,817 | B2 * | 11/2016 | Qiu | | G01K 7/01 |
| 9,715,245 | B2 * | 7/2017 | Yen | | G05F 3/267 |
| 9,829,387 | B2 * | 11/2017 | Furtner | | H10D 30/669 |
| 9,970,826 | B2 * | 5/2018 | Xia | | G01K 7/015 |
| 10,295,416 | B2 * | 5/2019 | Singh | | G01K 15/005 |
| 2005/0068214 | A1 * | 3/2005 | Kim | | G01K 1/02 |
| | | | | | 374/E1.002 |
| 2007/0075699 | A1 * | 4/2007 | Chih | | G05F 3/30 |
| | | | | | 323/313 |
| 2008/0094131 | A1 * | 4/2008 | Pertijs | | G05F 3/205 |
| | | | | | 327/542 |
| 2008/0095213 | A1 * | 4/2008 | Lin | | G01K 7/015 |
| | | | | | 374/170 |
| 2008/0165826 | A1 * | 7/2008 | Cheng | | G01K 1/20 |
| | | | | | 374/178 |
| 2013/0002358 | A1 * | 1/2013 | Mitchell | | G01L 1/2281 |
| | | | | | 330/297 |

| | | | | | |
|---|---|---|---|---|---|
| 2013/0235903 | A1 * | 9/2013 | Wong | | H10N 10/17 |
| | | | | | 374/178 |
| 2013/0301680 | A1 * | 11/2013 | Qiu | | G01K 7/01 |
| | | | | | 374/E1.001 |
| 2014/0092939 | A1 * | 4/2014 | Chang | | G01K 7/01 |
| | | | | | 257/E23.179 |
| 2014/0293272 | A1 * | 10/2014 | Xu | | G01J 1/44 |
| | | | | | 356/72 |
| 2014/0314124 | A1 * | 10/2014 | Ash | | G01K 7/01 |
| | | | | | 374/183 |
| 2016/0091916 | A1 * | 3/2016 | Chang | | G05F 3/262 |
| | | | | | 323/268 |
| 2016/0224146 | A1 * | 8/2016 | Malevsky | | G05F 3/30 |
| 2017/0023416 | A1 * | 1/2017 | Kim | | G01K 7/01 |
| 2017/0328790 | A1 * | 11/2017 | Bach | | G01K 15/002 |
| 2018/0100774 | A1 * | 4/2018 | Singh | | G01K 15/005 |
| 2018/0226929 | A1 * | 8/2018 | Kamath | | H03M 1/00 |
| 2019/0094079 | A1 * | 3/2019 | Elsayed | | G05F 1/56 |
| 2019/0278316 | A1 * | 9/2019 | Lee | | H03M 1/46 |
| 2019/0353534 | A1 * | 11/2019 | Mordakhay | | G01K 7/226 |
| 2022/0100220 | A1 * | 3/2022 | Mesgarani | | G01K 7/01 |
| 2023/0152165 | A1 * | 5/2023 | Singh | | G01K 15/005 |
| | | | | | 374/163 |

FOREIGN PATENT DOCUMENTS

| | | |
|---|---|---|
| CN | 101995301 A | 3/2011 |
| CN | 102338668 A | 2/2012 |
| CN | 102486414 A | 6/2012 |
| CN | 102778304 A | 11/2012 |
| CN | 102853931 A | 1/2013 |
| CN | 105572557 A | 5/2016 |
| CN | 207268657 U | 4/2018 |
| NL | 2000670 C | 8/2009 |
| WO | 2017/014336 A1 | 1/2017 |

OTHER PUBLICATIONS

Mike Tuthill, "A Switched-Current, Switched-Capacitor Temperature Sensor in 0.6-um CMOS", IEE Journal of Solid-State Circuits, vol. 33, No. 7, 1998. (Year: 1998).

* cited by examiner

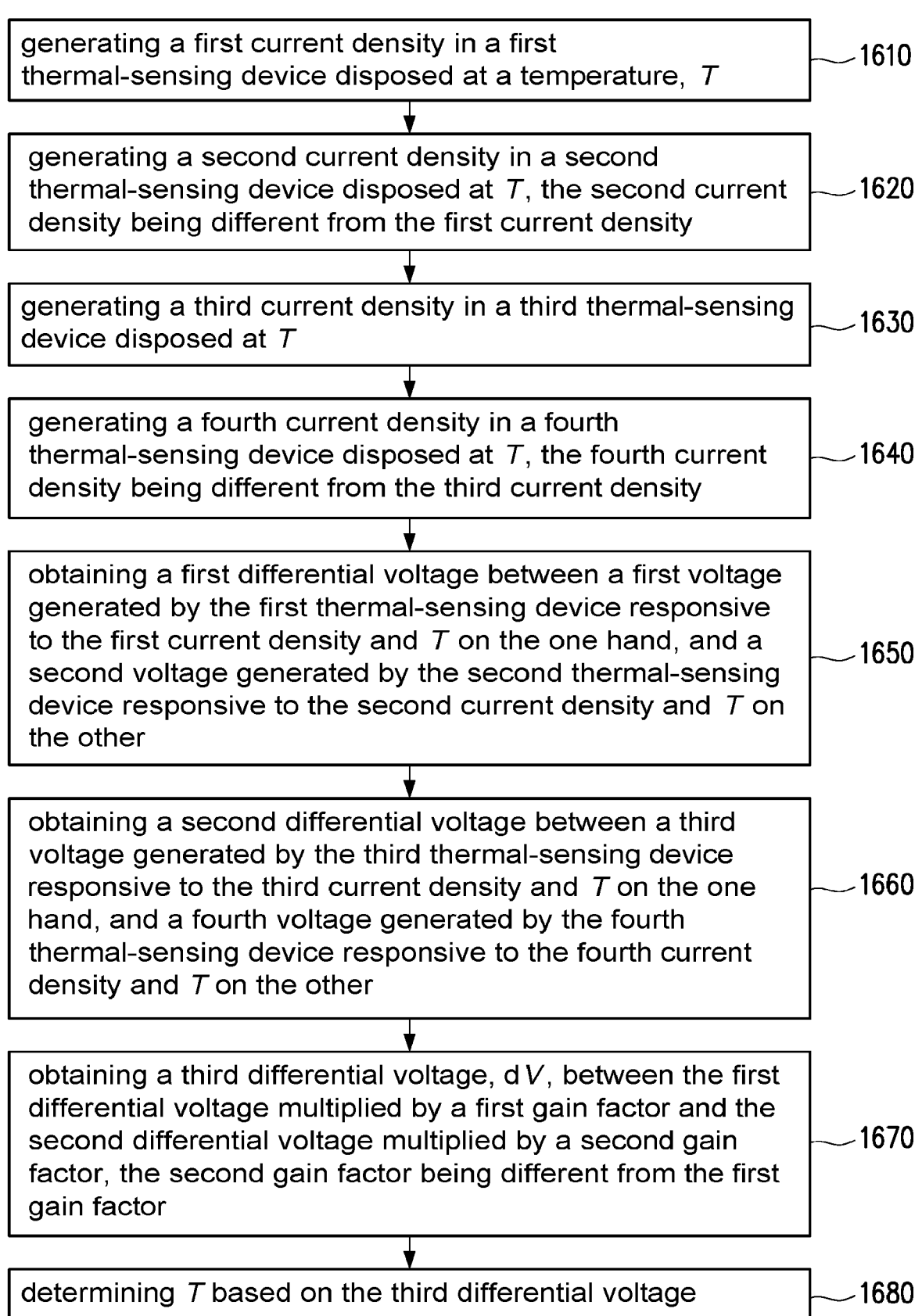

generating a first current density in a first thermal-sensing device disposed at a temperature, *T* — 1610 generating a second current density in a second thermal-sensing device disposed at *T*, the second current density being different from the first current density — 1620 generating a third current density in a third thermal-sensing device disposed at *T* — 1630 generating a fourth current density in a fourth thermal-sensing device disposed at *T*, the fourth current density being different from the third current density — 1640 obtaining a first differential voltage between a first voltage generated by the first thermal-sensing device responsive to the first current density and *T* on the one hand, and a second voltage generated by the second thermal-sensing device responsive to the second current density and *T* on the other — 1650 obtaining a second differential voltage between a third voltage generated by the third thermal-sensing device responsive to the third current density and *T* on the one hand, and a fourth voltage generated by the fourth thermal-sensing device responsive to the fourth current density and *T* on the other — 1660 obtaining a third differential voltage, d*V*, between the first differential voltage multiplied by a first gain factor and the second differential voltage multiplied by a second gain factor, the second gain factor being different from the first gain factor — 1670 determining *T* based on the third differential voltage — 1680

FIG. 16

LOW TEMPERATURE ERROR THERMAL SENSOR

CROSS REFERENCE TO RELATED APPLICATION

This application is a continuation of U.S. patent application Ser. No. 16/571,914, filed Sep. 16, 2019, which application claims the benefit of U.S. Provisional Application No. 62/738,292, filed Sep. 28, 2018, the disclosures of which are hereby incorporated herein by reference.

BACKGROUND

This disclosure relates generally to thermal sensors. This disclosure more specifically relates to reducing temperature errors for thermal sensors.

Thermal sensors find a wide range of uses. Accuracy of thermal sensors is important, or even critical, for many applications. Where a thermal sensor is calibrated at only one or limited number of temperatures, the accuracy of the thermal sensor over the full range of intended use may be difficult to ensure due to deviations of the sensor characteristics from ideal characteristics. Efforts are ongoing in improving thermal sensor accuracy.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 16 outlines a method of temperature measurement according to an aspect of the present disclosure.

DETAILED DESCRIPTION

Figure 1A:
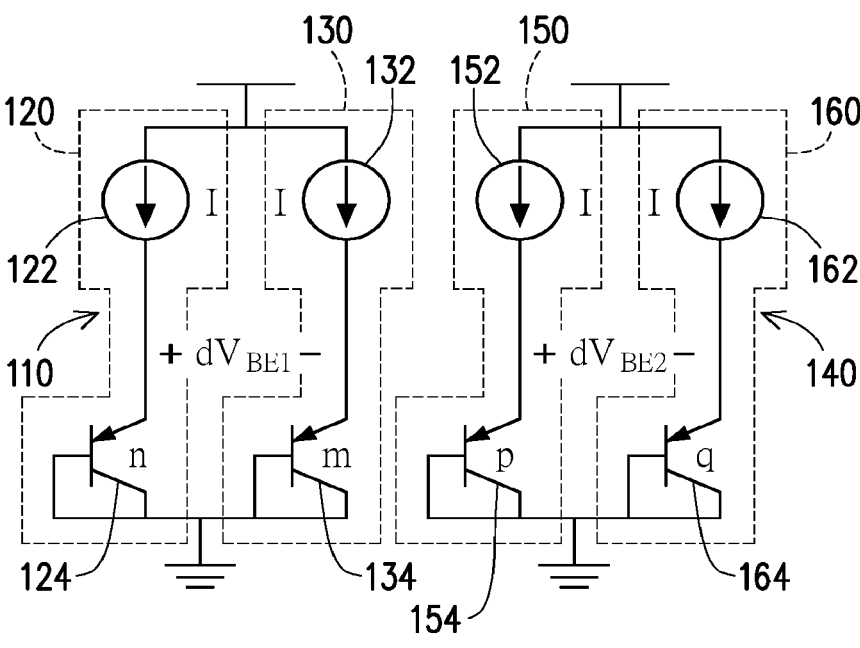
FIG. 1A schematically shows component thermal sensors in a thermal sensor according to one aspect of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Thermal sensors, or temperature sensors, are widely used in a variety of applications. For example, thermal sensors are used in integrated circuits, such as memory modules, to monitor and control the temperature of the integrated circuits to ensure their proper operation. Examples of thermal sensors include sensors employ bipolar junction transistors ("BJTs"), for which the voltage between terminal pairs (such as base-emitter voltage, or $V_{BE}$) has certain temperature dependency that has certain characteristics, such as exponential dependency in ideal (theoretical) cases. Deviations from the ideal characteristics cause errors in temperature measurements. Certain embodiments disclosed herein have reduced temperature errors than conventional thermal sensors.

In some embodiments, a temperature sensor includes two pairs of BJTs. In each pair, the two BJTs have different current densities, either by passing the same current through two BJTs of different sizes, or passing different currents through two BJTs of the same size, or a combination of the two methods. Each BJT produces a $V_{BE}$ as the result. The differential $V_{BE}$ ($dV_{BE}$, or $\Delta V_{BE}$), or the difference between two $V_{BE}$'s, in each pair, is obtained, and the difference between $dV_{BE}$'s of the two pairs is taken as the output signal. The $dV_{BE}$'s from the pairs can be amplified differently so that the $dV_{BE}$'s has substantially the same offset value (S1) in a parameter, such as the offset voltage at a reference temperature (e.g., 0K), where the offset voltage can be defined as the offset voltage, at the reference temperature, of the tangent line (or some other linear approximation of the $dV_{BE}$-temperature curve within the operating temperature range) of the $dV_{BE}$-temperature curve at a calibration point (e.g., 25° C.). Other forms of approximations of the voltage-temperature relationships can also be used. Other types of transistors, such as MOSFETs, can be used instead of the BJTs.

In some embodiments, a single pair of BJTs can be used, but the $V_{BE}$'s can be amplified differently such that the amplified $V_{BE}$-temperature curves match closely over the intended operational temperature range.

Referring to FIG. 1A, two BJT pairs (110,140) are configured to generate the $dV_{BE}$'s ($dV_{BE1}$ and $dV_{BE2}$, respectively), which are to be combined to provide a voltage signal that is closer to having a more desirable temperature dependency than either of the BJT pairs (110,140). A more desirable temperature dependency can by, for example, a linear dependency in which the voltage is substantially proportional to absolute temperature ("PTAT"), such that a single-point temperature calibration (e.g., at 25° C.) is sufficiently reliable to temperature sensing throughout the intended range of temperatures (e.g., from about −50° C. through about 150° C., −40° C. through about 125° C., from about −25° C. through about 110° C., or from about 0° C. through about 100° C.) for the operation of the electronic device.

Each BJT pair (110, 140) in the example illustrated in FIG. 1A includes two branches (120, 130 in the pair (110), and (150, 160) in the pair (140)) connected to each other in parallel. Each branch includes a current source (122, 132, 152, 162) connected in series with a diode-connected transistor (124, 134, 154, 164), respectively. The base and collector in each of the diode-connected transistors are connected to each other and connected to a common reference point (in this example, ground); the emitter is connected to the currently source.

Each diode-connected transistor (124, 134, 154, 164) is designed to operate at its respective emitter current density. The current density in each diode-connected transistor is determined by the current in the respective branch and the cross-sectional area n, m, p, or q, of the emitter-base junction ("emitter area") of the diode-connected transistor. Thus, different current densities can be produced by currents of different amplitudes from the current sources (122, 132, 152, 162) with the same cross-sectional areas for the emitter-base junctions in the diode-connected transistors (124, 134, 154, 164). Different current densities can also be produced by currents of the same amplitude from the current sources (122, 132, 152, 162) but different emitter areas n, m, p, and q, respectively, for the diode-connected transistors (124, 134, 154, 164). In a further alternative, different current densities can be produced by the currents of the different amplitudes from the current sources (122, 132, 152, 162)

with different cross-sectional areas for the emitter-base junctions in the diode-connected transistors (124, 134, 154, 164).

Given the different current densities in the two branches of each BJT pair (110, 140), a differential voltage is generated between the emitters of the two diode-connected transistors in the BJT pair as a function of the temperature the two diode-connected transistors are at. Thus, a differential voltage $dV_{BE1}$ is generated between the emitters of diode-connected transistors (124, 134); a differential voltage $dV_{BE2}$ is generated between the emitters of diode-connected transistors (154, 164).

Figure 1B:
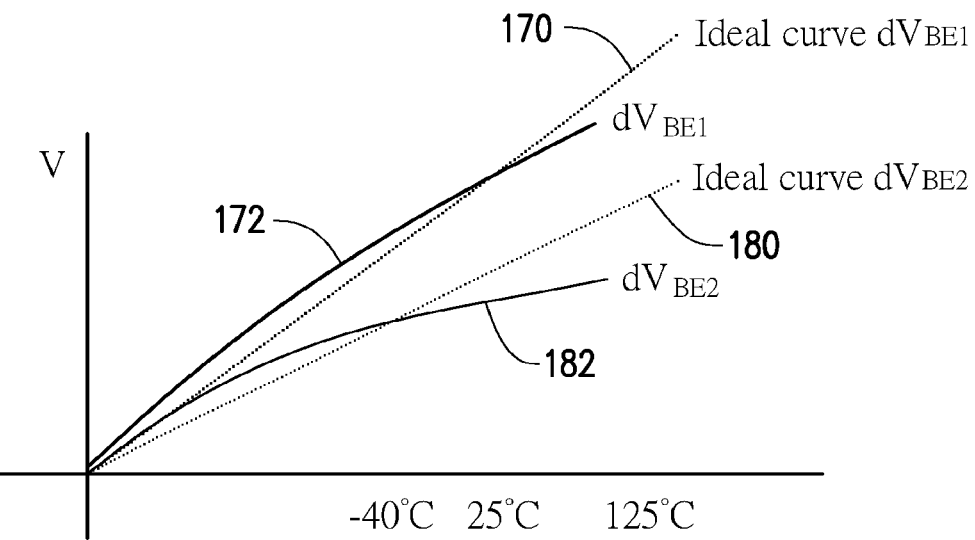
FIG. 1B is an illustration of ideal and actual voltage-temperature relationships for each of the component thermal sensors in FIG. 1A according to one aspect of the present disclosure.

Referring to FIG. 1B, for each BJT pair (110, 140), the differential base-emitter voltage ($dV_{BE21}$ or $dV_{BE2}$) has it temperature dependency. The relationship between the differential base-emitter voltage ($dV_{BE}$ (=$dV_{BE21}$ or $dV_{BE2}$)) and current densities, $$dV_{BE} = CT = \frac{\eta kT}{q}\ln r,$$

where T is absolute temperature at the BJT pair, $\eta$ is an ideality factor, k is the Boltzmann constant, q is the electron charge, r is the ratio between the emitter current densities in the BJT pair, and $$C = \frac{\eta k}{q}\ln r.$$

In cases where the currents in both branches of each BJT pair are equal, r=n/m and r=p/q, respectively.

For ideal thermal sensors, in which $\eta$ is a constant for all temperatures, C is a constant, $V_{BE}$ is a proportional to the absolute temperature, T, and the plot of $dV_{BE}$ as a function of temperature is a straight line passing through the origin, i.e., $dV_{BE}$=0 V at T=0 K. Thus, for the BJT pairs (110, 140), the ideal $dV_{BE1}$-T and $dV_{BE2}$-T plots would be straight lines (170, 180), respectively, in FIG. 1B. In actual thermal sensors, however, the ideality factor $\eta$, is typically not constant with temperature. Consequently, the $dV_{BE}$-T relationship would typically not be linear, as indicated by curves (172, 182) for the BJT pairs (110, 140), respectively.

Figure 2A:
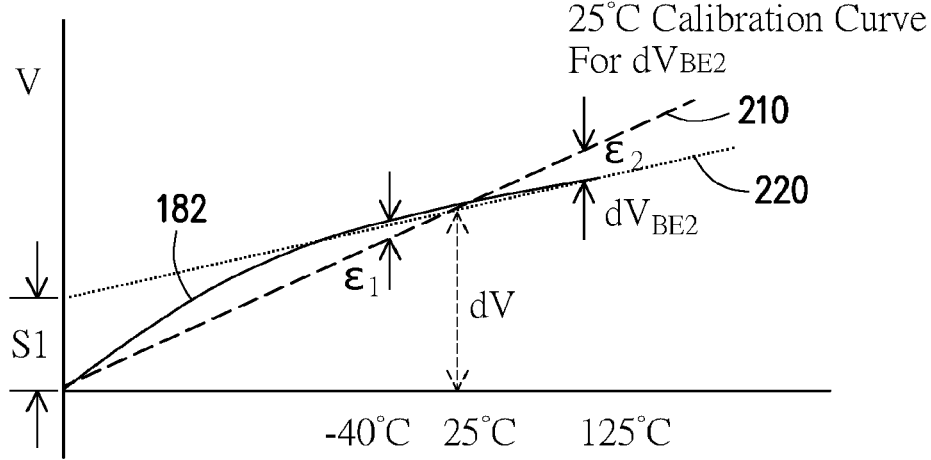
FIG. 2A is an illustration of approximating the voltage-temperature relationship in an operating temperature range for a component thermal sensor according to one aspect of the present disclosure.

Referring to FIG. 2A, and using the BJT pair (140) as an example, for an ideal BJT pair, a PTAT relationship for $dV_{BE2}$ would result in a straight line (210) in a $dV_{BE2}$-T plot, as discussed above. In such a case, a single-point calibration, i.e., calibration by measuring $dV_{BE2}$ at a single temperature, such as 25° C., would result in accurate temperature measurements because a single constant, C (or the slope of the straight line (210)), would be needed to determine all values of $dV_{BE2}$ at all temperatures. However, as C is typically not a constant with temperature, the actual $dV_{BE2}$-T plot is typically a curve, such as the curve conceptually illustrated (182). As a result, a single-point calibration (e.g., at 25° C.) would result in errors, in some cases significant, at temperatures away from the calibration point (e.g., $\varepsilon_1$ at −40° C. and $\varepsilon_2$ at) 125°.

In practical applications, accuracy of calibration of temperature sensors is of concern only for the intended temperature range of operation, such as from about −40° C. to about 125°. In accordance with certain aspects of the present disclosure, differential base-emitter voltages from two BJT pairs (110, 140) can be appropriately combined to obtain a signal that is substantially PTAT at least in the intended temperature range of operation, such that single-point cali-brations are adequate for the intended operation of the electronic device. For example, in FIG. 2A, the $dV_{BE2}$-T curve (182) may be adequately approximated by a straight line (220) in the temperature range from about −40° C. to about 125°. The straight line (220) may be based on any approximation method that results in errors within an acceptable level over the intended temperature range of operation. For example, the line (220) can be the tangent line to the $dV_{BE2}$-T curve at the calibration temperature (e.g., 25° C.); in another example, the line (220) is the line connecting the two ends (e.g., at −40° C. and 125°) of segment of the curve (182) over the intended temperature range; in a further example, line (220) can be a least-square fit to the curve over the intended temperature range.

Figure 2B:
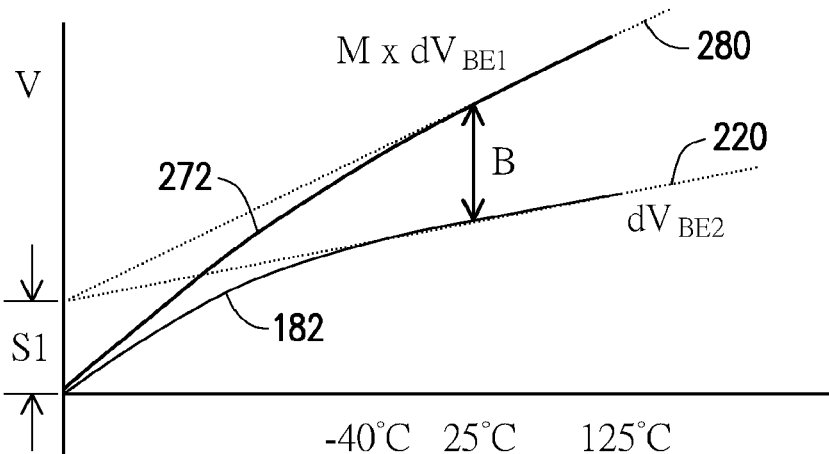
FIG. 2B illustrates modified relative voltage-temperature relationships for two component thermal sensors matching offsets according to one aspect of the present disclosure.

Similarly, as shown in the $dV_{BE1}$-T curve (172) can be approximated by a straight line (not shown in the drawings) over the same temperature range as for the $dV_{BE2}$-T curve (182). The line (220) for the $dV_{BE2}$-T curve (182) in this case has an intersect $S_1$ on the y-axis (i.e., 0 K); the line for the $dV_{BE1}$-T curve (172) in this case has an intersect $S_2$ on the y-axis. According to an aspect of the present disclosure, $dV_{BE1}$ can be amplified by a factor, M (which can be greater, equal, or smaller than 1), such that $M \cdot S_2 = S_1$. As shown in FIG. 2B, the line (280) that approximate the amplified differential voltage curve (272), $M \times dV_{BE1}$, has the same intersect, $S_1$, as the $dV_{BE2}$-T curve (182). The differential voltage, $dV_{BE12}$, is thus of the form, $$dV_{BE12} = M \cdot dV_{BE1} - dV_{BE2} \approx C'T + M \cdot S_2 - C''T - S_1 = (C' - C'')T,$$

where C' and C" are constants. The combined differential voltage is thus substantially PTAT, and the thermal sensor producing such a differential voltage is suitable for single-point calibration. That is, a differential voltage value, $dV_0$, can be obtained ad $dV_{BE12}$ at a single, known temperature, $T_0$ (e.g., 25° C. (or 298 K)), and the temperature, T, can be determined as $T = dV \cdot T_0/dV_0$, wherein T and $T_0$ are measured in K.

$$dV_{BE12} = M \cdot dV_{BE1} - N \cdot dV_{BE2},$$

is substantially a PTAT signal.

Thus, to obtain a substantially PTAT signal in a temperature measurement, the following steps can be taken, according to some embodiments: generating a first current density in a first thermal-sensing device disposed at a temperature, T (1610); generating a second current density in a second thermal-sensing device disposed at T (1620), the second current density being different from the first current density; generating a third current density in a third thermal-sensing device disposed at T (1630); generating a fourth current density in a fourth thermal-sensing device disposed at T, the fourth current density being different from the third current density (1640); obtaining a first differential voltage between a first voltage generated by the first thermal-sensing device responsive to the first current density and T on the one hand, and a second voltage generated by the second thermal-sensing device responsive to the second current density and T on the other (1650); obtaining a second differential voltage between a third voltage generated by the third thermal-sensing device responsive to the third current density and T on the one hand, and a fourth voltage generated by the fourth thermal-sensing device responsive to the fourth current density and T on the other (1660); obtaining a third differential voltage, dV, between the first differential voltage multiplied by a first gain factor and the second differential voltage multiplied by a second gain factor, the second gain factor being different from the first gain factor (1670); and determining T based on the third differential voltage (1680).

Figure 3:
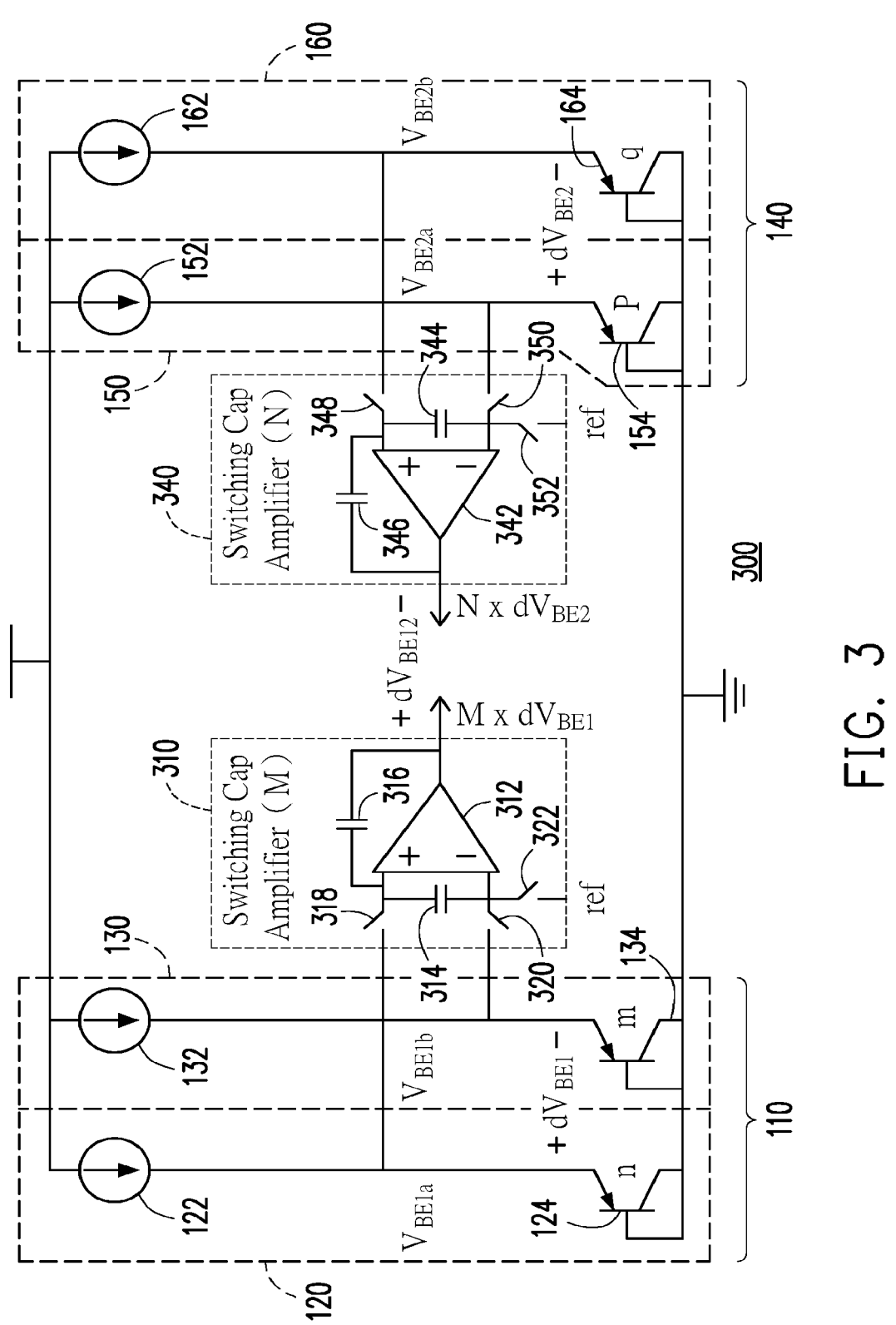
FIG. 3 schematically illustrates a discrete-timing-type thermal sensor circuit according to one aspect of the present disclosure.

Referring to FIG. 3, a thermal sensor circuit (300) according to one aspect of the present disclosure implements the scheme described above for obtaining a substantially PTAT thermal sensor. In this example, the circuit (300) is a discrete-timing type circuit. It includes the BJT pairs (110, 140) described above, and a signal processing circuit, which in this example is a pair of switched-capacitor amplifiers (310, 340). The switched-capacitor amplifier (310) includes an op-amp (312), an input capacitor (314), a feedback capacitor (316), and switches (318, 320, 322), which can be any suitable switching devices, including switching transistors. Similarly, the switched-capacitor amplifier (340) includes an op-amp (342), an input capacitor (344), a feedback capacitor (346), and switches (348, 350, 352), which can be any suitable switching devices, including switching transistors. The switched inputs of the amplifier (310) are connected to the respective emitters of the diode-connected transistors (124, 134) to receive the differential signal $dV_{BE1}$, which is the difference between the voltage $V_{BE1a}$ at the emitter of the diode-connected transistor (124) and the voltage $V_{BE1b}$ at the emitter of the diode-connected transistor (134). Similarly, the switched inputs of the amplifier (340) are connected to the respective emitters of the diode-connected transistors (154, 164) to receive the differential signal $dV_{BE2}$, which is the difference between the voltage $V_{BE2a}$ at the emitter of the diode-connected transistor (154) and the voltage $V_{BE2b}$ at the emitter of the diode-connected transistor (164).

The amplifiers (310, 340) in one example have gains M and N, respectively, where $M \cdot S_2 - N S_1 = 0$, where $S_1$ and $S_2$ are, respectively, the y-intersects of the lines approximating the $dV_{BE2}$-T curve (182) and $dV_{BE1}$-T curve (172) in the intended temperature range of operation (e.g., from about −40° C. to about 125° C.). The differential output signal, $dV_{BE12}$, is, as discussed above, substantially proportional to the absolute temperature within the intended temperature range of operation. The thermal sensor (300) is thus susceptible to single-point calibration.

As used in the present disclosure, "gain" or "amplification" connotes a factor by which a signal input into a circuit ("amplifier") is multiplied to generate the output of the circuit; the factor is not limited to numbers greater than 1.

Other discrete-timing type circuits, such as switched-capacitor sample/hold circuits, can also be used.

Figure 4:
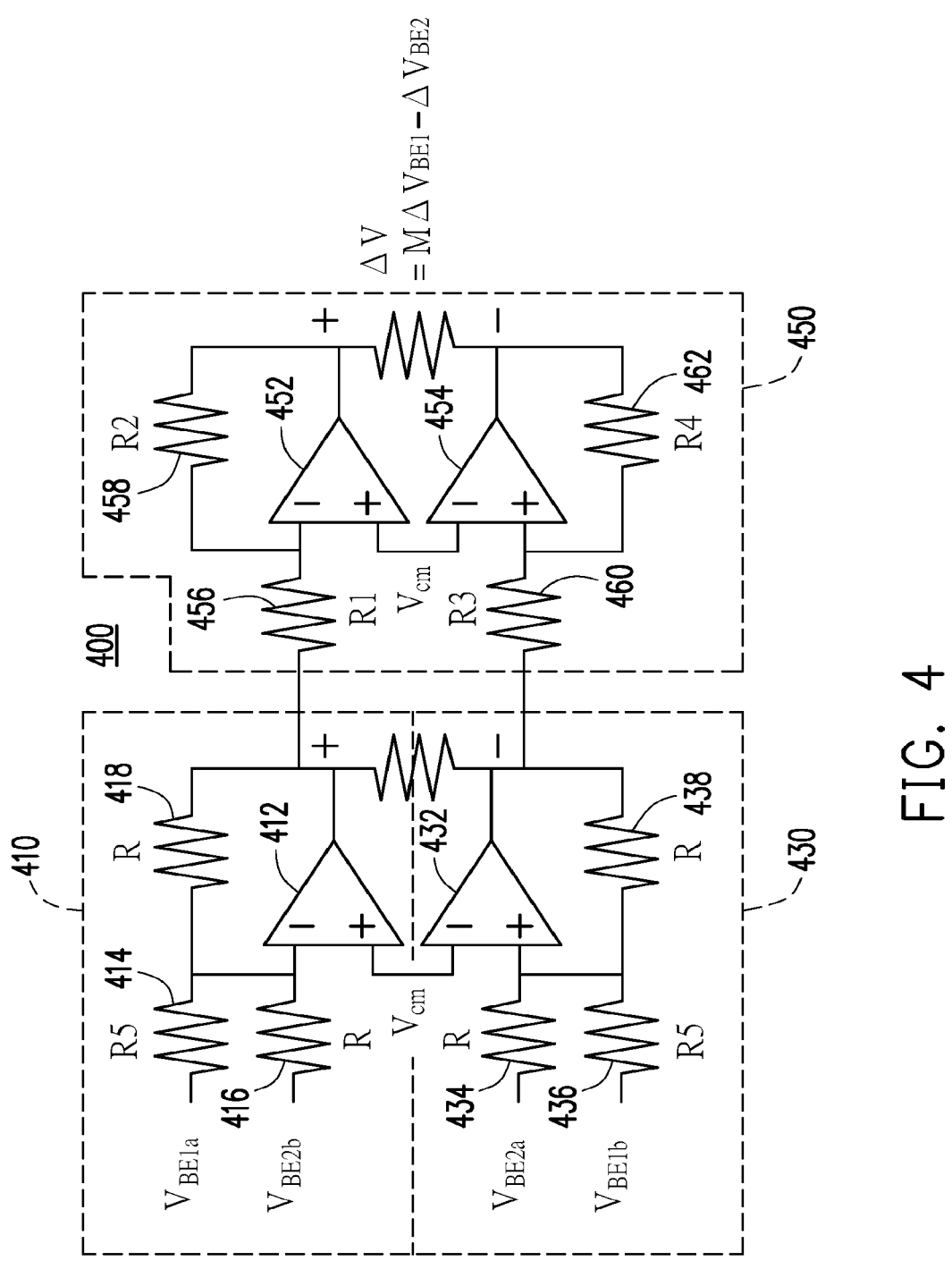
FIG. 4 schematically illustrates a continuous-DC-type thermal sensor circuit according to one aspect of the present disclosure.

Signal processing circuits for obtaining different gains for the two BJT pairs can be of any kind suitable for such purpose. For example, a continuous DC type circuit can also be used. In FIG. 4, for example, a continuous DC type amplifier (400) can be used instead of the switched-capacitor amplifiers (310, 340) shown in FIG. 3. The amplifier (400) includes a pair of summing amplifiers (410, 430) and a differential amplifier (450). The first summing amplifier (410) includes an op-amp (410), two input resistors (414, 416) and a feedback resistor (418). Similarly, the second summing amplifier (430) includes an op-amp (430), two input resistors (434, 436) and a feedback resistor (438). The differential amplifier (450) includes a pair or op-amps (452, 454), an input resistor (456) and feedback resistor (458) associated with the op-amp (452), and an input resistor (460) and feedback resistor (462) associated with the op-amp (454). The summing amplifiers (410, 430) receives two pairs of inputs: $V_{BE1a}$ and $V_{BE2b}$ for the amplifier (410), and $V_{BE2a}$ and $V_{BE1b}$ for the amplifier (430). The outputs of the summing amplifiers (410, 430) are inputs to the differential amplifier (450). The output, ΔV, of the differential amplifier (450) is a linear combination of the inputs $V_{BE1a}$, $V_{BE2b}$, $V_{BE2a}$, and $V_{BE1b}$. With appropriate selection of the resistance values of the resistors, $\Delta V$ can be set to a linear combination of $dV_{BE1}$ and $dV_{BE2}$. For example, with the resistance values symbolized in FIG. 4, $\Delta V=M \cdot dV_{BE1}-dV_{BE2}$ for $R_1=R_2=R_3=R_4$ with M being a value that makes $\Delta V$ substantially proportional to the absolute temperature (e.g., $M \cdot S_2-S_1=0$).

Figure 5:
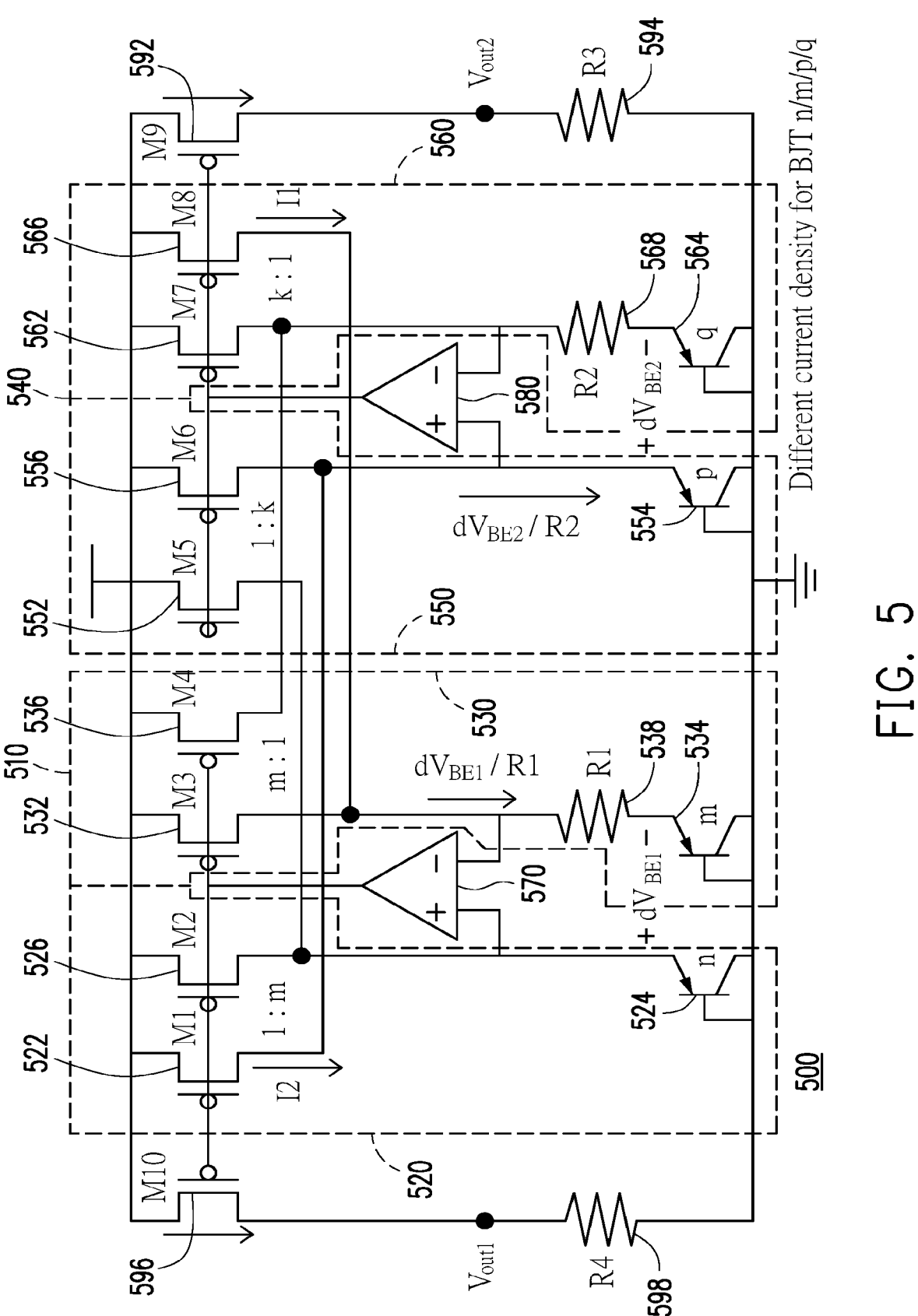
FIG. 5 schematically illustrates a continuous-DC-type thermal sensor circuit with differential feedback according to one aspect of the present disclosure.

Referring to FIG. 5, a thermal sensor circuit (500) according to another aspect of the present disclosure includes two branches of BJT pairs (510, 540). The first BJT pair (510) includes a pair of diode-connected transistors (524, 534), and current-bias transistors M1 (522), M2 (526), M3 (532), and M4 (536), where the labels "M1," "M2," "M3" and "M4" also denotes the sizes, such as channel widths, of the respective transistors (522, 526, 532, 536). Similarly, the second BJT pair (540) includes a pair of diode-connected transistors (554, 564), and current-bias transistors M5 (552), M6 (556), M7 (562), and M8 (566), where the labels "M5," "M6," "M7" and "M8" also denotes the sizes, such as channel widths, of the respective transistors (552, 556, 562, 566). The transistors M1-M8 in this example are field-effect transistors (FET's), such as Metal-Oxide-Semiconductor Field-Effect Transistors (MOSFET's) but can be any suitable type transistors. The emitter of the first diode-connected transistor (524) in the first branch (510) is directly connected to the drains of transistors M2 (526) and M5 (552); the emitter of the first diode-connected transistor (554) in the second branch (540) is directly connected to the drains of transistors M6 (556) and M1 (522). The emitter of the second diode-connected transistor (534) in the first branch (510) is connected to the drains of transistors M3 (532) and M8 (566) through resistor R1 (538); the emitter of the second diode-connected transistor (564) in the second branch (540) is connected to the drains of transistors M7 (562) and M4 (536) through a resister R2 (568).

Each branch (510, 540) is associated with a respective amplifier (570, 580). The input of the first amplifier (570) being the differential voltage, $dV_{BE1}$, between the emitters of the diode-connected transistors (524, 534) through resistor R1 (538); the input of the second amplifier (580) being the differential voltage, $dV_{BE2}$, between the emitters of the diode-connected transistors (554, 564) through resistor R2 (568). The output of the first amplifier (570) is connected to the control electrodes (gates in this example) of transistors M1 (522), M2 (526), M3 (532), and M4 (536); the output of the second amplifier (580) is connected to the control electrodes (gates in this example) of transistors M5 (552), M6 (556), M7 (562), and M8 (566).

A first output, $V_{out1}$, of the thermal sensor (500) is provided at the junction between a first output resistor R4 (598) and the drain of a first output transistor M10 (596); a second output, $V_{out2}$, of the thermal sensor (500) is provided at the junction between a second output resistor R3 (594) and the drain of a second output transistor M9 (592). The control electrode (gate in this example) of the first output transistor M10 (596) is connected to the control electrodes of transistors M1 (522), M2 (526), M3 (532), and M4 (536); the control electrode (gate in this example) of the second output transistor M9 (592) is connected to the control electrodes of transistors M5 (552), M6 (556), M7 (562), and M8 (566). The source electrodes of transistors M1 through M10 and connected together. Transistor M10 and resistor R4 form a first current mirror with transistor M1, generating the voltage output $V_{out1}$ from resistor R4 and image current of the current, I2, through the transistor M1. Likewise, transistor M9 and resistor R3 form a second current mirror with transistor M8, generating the voltage output $V_{out2}$ from resistor R3 and image current of the current, I1, through the transistor M8.

In this example, the outputs, $V_{out1}$ and $V_{out1}$, are each a function of $dV_{BE1}$ and $dV_{BE2}$, each of which is a function of ratio current densities in the BJT pair (510, 540). Similar to the configuration shown in FIG. 3, the current density ratio in each BJT pair can be set by the same BJT size (n=m; p=q) but a non-unity ratio ($I_{M2}:I_{M3}$) between the currents through the transistors M2 and M3 (for BJT pair (510)), or M6 and M7 ($I_{M6}:I_{M7}$) (for BJT pair (540)). Alternatively, the current density ratio in each BJT pair can be set by the same currents through the transistors M2 and M3 ($I_{M2}:I_{M3}=1$), or M6 and M7 ($I_{M6}:I_{M7}=1$), but different BJT sizes. A combination of the above two configurations (i.e., different BJT sizes and transistor currents) can also be employed.

The current ratios, $I_{M2}:I_{M3}$ and $I_{M6}:I_{M7}$, in turn, are functions of $dV_{BE1}/R1$ and $dV_{BE2}/R2$, respectively. The current ratios are further functions of ratios of W/L ratios between transistors M1 and M2, M4 and M3, M5 and M6, and M8 and M7, where the W/L ratio for a transistor is the aspect ratio (width:length) of the channel of the transistor. In one example, the ratio of W/L ratios between transistors M1 and M2, and between transistor M4 and M3 is 1:m; the ratio of W/L ratios between transistors M5 and M6, and between transistor M8 and M7 is 1:k. In such a configuration, the output $V_{out1}$ is $k_1(m_1dV_{BE1}-dV_{BE2})$, where $k_1$ and $m_1$ are functions of R1, R2, m, k, and R4; similarly, the output $V_{out2}$ is $k_2(m_2dV_{BE2}-dV_{BE1})$, where $k_2$ and $m_2$ are functions of R1, R2, m, k, and R3. Thus, by appropriate choices of resistance values R1, R2, R3, and R4, and ratios m and k, the voltage offset for $dV_{BE2}$ and/or $dV_{BE1}$ can be set to generate a PTAT voltage, suitable for single-point calibration.

Figure 6:
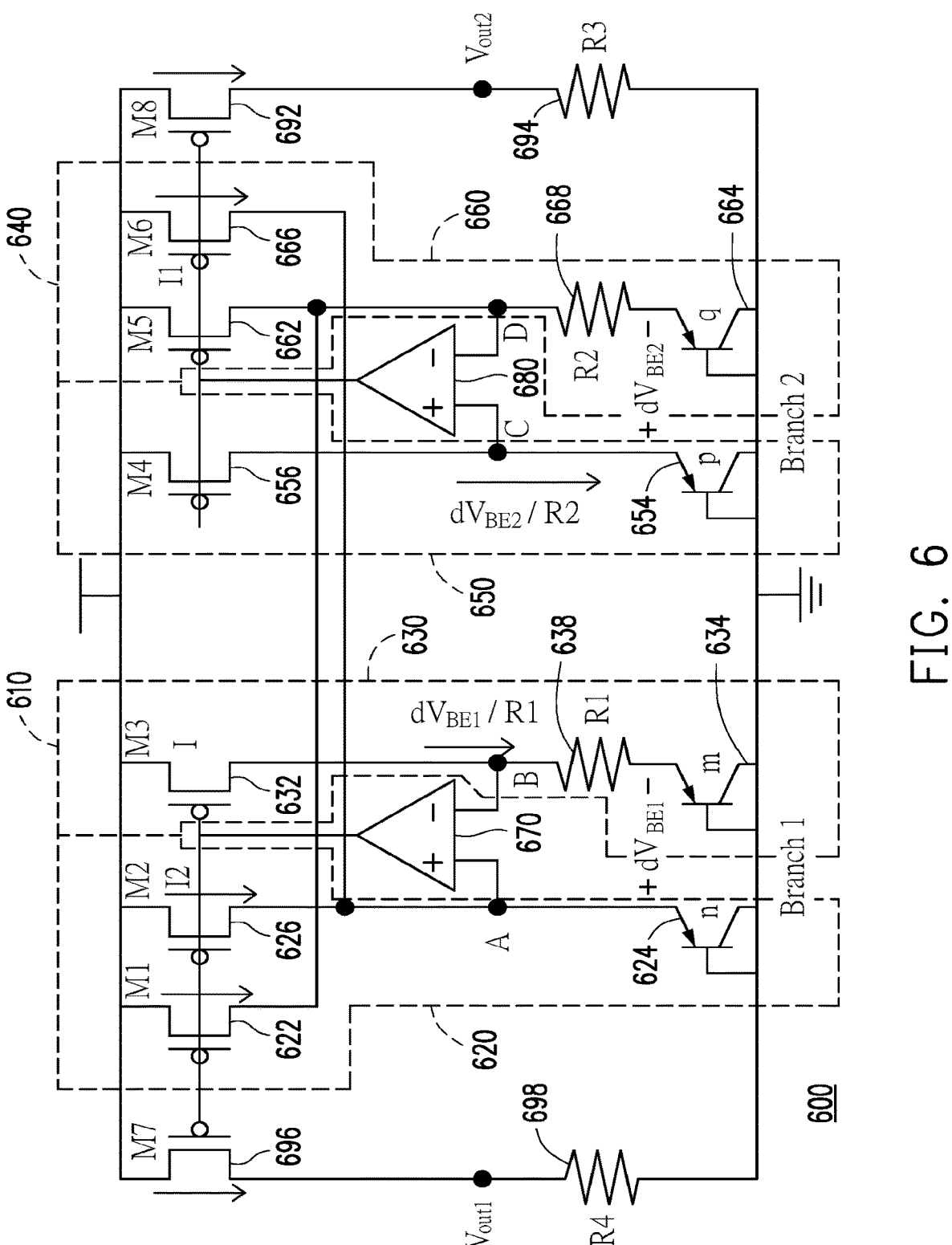
FIG. 6 schematically illustrates a continuous-DC-type thermal sensor circuit with single-ended feedback according to one aspect of the present disclosure.

Referring to FIG. 6, a thermal sensor circuit (600) according to another aspect of the present disclosure includes two branches of BJT pairs (610, 640). The first BJT pair (610) includes a pair of diode-connected transistors (624, 634), and current-bias transistors M1 (522), M2 (626) and M3 (632), where the labels "M1," "M2" and "M3" also denotes the sizes, such as channel widths, of the respective transistors (622, 626, 632). Similarly, the second BJT pair (640) includes a pair of diode-connected transistors (654, 664), and current-bias transistors M4 (656), M5 (662) and M6 (666), where the labels "M4," "M5" and "M6" also denotes the sizes, such as channel widths, of the respective transistors (656, 662, 666). The transistors M1-M6 in this example are field-effect transistors (FET's), such as Metal-Oxide-Semiconductor Field-Effect Transistors (MOSFET's) but can be any suitable type transistors. The emitter of the first diode-connected transistor (624) in the first branch (610) is directly connected to the drains of transistors M2 (626) and M6 (666); the emitter of the first diode-connected transistor (654) in the second branch (640) is directly connected to the drain of transistor M4 (656). The emitter of the second diode-connected transistor (634) in the first branch (610) is connected to the drain of transistor M3 (632) through resistor R1 (638); the emitter of the second diode-connected transistor (664) in the second branch (640) is connected to the drains of transistors M5 (662) and M1 (622) through a resister R2 (668).

Each branch (510, 540) is associated with a respective amplifier (670, 680). The input of the first amplifier (670) being the differential voltage, $dV_{BE1}$, between the emitters of the diode-connected transistors (624, 634) through resistor R1 (638); the input of the second amplifier (680) being the differential voltage, $dV_{BE2}$, between the emitters of the diode-connected transistors (654, 664) through resistor R2

(668). The output of the first amplifier (570) is connected to the control electrodes (gates in this example) of transistors M1 (622), M2 (626), and M3 (632); the output of the second amplifier (680) is connected to the control electrodes (gates in this example) of transistors M4 (656), M5 (662), and M6 (666).

A first output, $V_{out1}$, of the thermal sensor (600) is provided at the junction between a first output resistor R4 (698) and the drain of a first output transistor M7 (696); a second output, $V_{out2}$, of the thermal sensor (600) is provided at the junction between a second output resistor R3 (694) and the drain of a second output transistor M8 (692). The control electrode (gate in this example) of the first output transistor M7 (696) is connected to the control electrodes of transistors M1 (622), M2 (626), and M3 (632); the control electrode (gate in this example) of the second output transistor M8 (692) is connected to the control electrodes of transistors M4 (656), M5 (662), and M6 (666). The source electrodes of transistors M1 through M8 and connected together. Transistor M7 and resistor R4 form a first current mirror with transistor M1, generating the voltage output $V_{out1}$ from resistor R4 and image current of the current, I2, through the transistor M1. Likewise, transistor M8 and resistor R3 form a second current mirror with transistor M6, generating the voltage output $V_{out2}$ from resistor R3 and image current of the current, I1, through the transistor M6.

Figure 7:
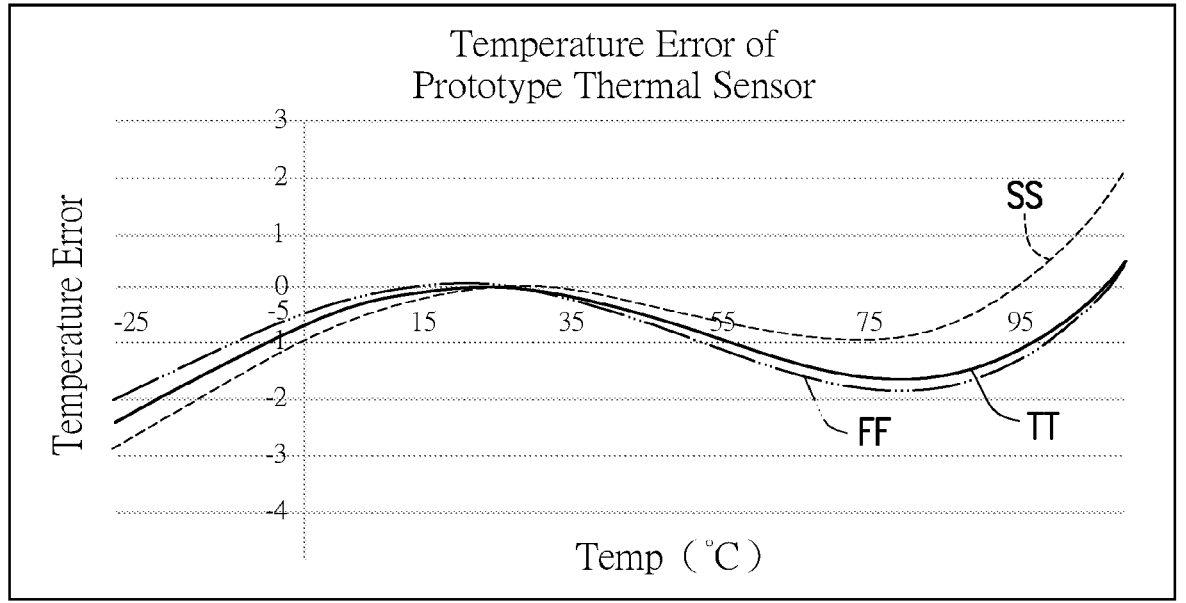
FIG. 7 shows temperature performance data at various process corners for prototype thermal sensors of the type shown in FIG. 6.

In this example, the outputs, $V_{out1}$ and $V_{out1}$, are each a function of $dV_{BE1}$ and $dV_{BE2}$, each of which is a function of ratio current densities in the BJT pair (610, 640). Similar to the configurations shown in FIGS. 3 and 5, the current density ratio in each BJT pair can be set by a combination of BJT size (n/m; p/q) and the ratio ($I_{M1}:I_{M2}:I_{M3}$) between the currents through the transistors M1, M2 and M3 (for BJT pair (610)), or M4, M5 and M6 ($I_{M4}:I_{M5}:I_{M6}$) (for BJT pair (640)). The current ratios, in turn, are functions of $dV_{BE1}/R1$ and $dV_{BE2}/R2$, respectively. The current ratios are further functions of ratios of W/L ratios between transistors M1, M2 and M3, and between M4, M5 and M6. Similar to the configuration shown in FIG. 5, in the configuration in FIG. 6, the output $V_{out1}$ is $k_1(m_1 dV_{BE1} - dV_{BE2})$, where $k_1$ and $m_1$ are functions of R1, R2, and R4, and the W/L ratios of M1, M2 and M3; similarly, the output $V_{out2}$ is $k_2(m_2 dV_{BE2} - dV_{BE1})$, where $k_2$ and $m_2$ are functions of R1, R2 and R3, and the W/L ratios of M4, M5 and M6. Thus, by appropriate choices of resistance values R1, R2, R3, and R4, and W/L ratios, the voltage offset for $dV_{BE2}$ and/or $dV_{BE1}$ can be set to generate a PTAT voltage, suitable for single-point calibration. As an example, plots of temperature errors as a function of temperature for several process corners (TT, FF and SS) for the thermal sensor shown in FIG. 6 are illustrated in FIG. 7. The single-point calibration is done at 25° C. The temperature errors in the temperature range of −25° C. to 110° C. is within about 3° C. That is, the temperature determined by a straight (PTAT) line passing through (T=0 K, $dV_{BE1}2=0$ V) and (T=273 K+25 K, $dV_{BE12}$ at 25° C.) in a $dV_{BE12}$-T plot differs from the actual temperature by no more than 3° C. More generally, the output of a thermal sensor is substantially PTAT if the temperature determined by a straight (PTAT) line passing through (T=0 K, $dV_{BE1}2=0$ V) and a calibration point (e.g., T=273 K+25 K, $dV_{BE12}$ at 25° C.) in a $dV_{BE12}$-T plot differs from the actual temperature by no more than an amount (e.g., 3, 2 or 1° C.) deemed acceptable for the proper operation of the device (e.g., integrated circuit) over an intended range of temperatures.

In another aspect of the present disclosure, instead of combining output signals of two transistor pairs to achieve a more linear temperature dependence, the temperature-dependent voltages from two single transistors can be appropriately combined to obtain a more linear signal, with temperature, than with a single transistor. For example, in one aspect of the present disclosure, the base-emitter voltages ($V_{BE}$'s) in a single BJT pair, such as the BJT pair (110), can be appropriately combined to produce a signal that is more linear with absolute temperature than the $V_{BE}$ of either transistor (124, 134).

Figure 8A:
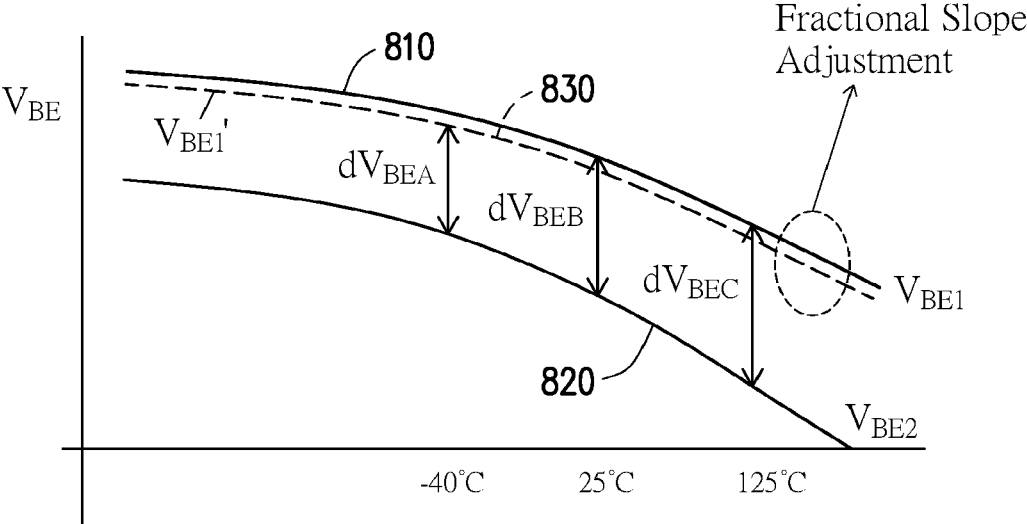
FIG. 8A illustrates voltage-temperature relationships for two transistors in a differential current-density thermal sensor and fractional slope adjustment of the voltage-temperature relationship of one of the transistors according to one aspect of the present disclosure.
Figure 8B:
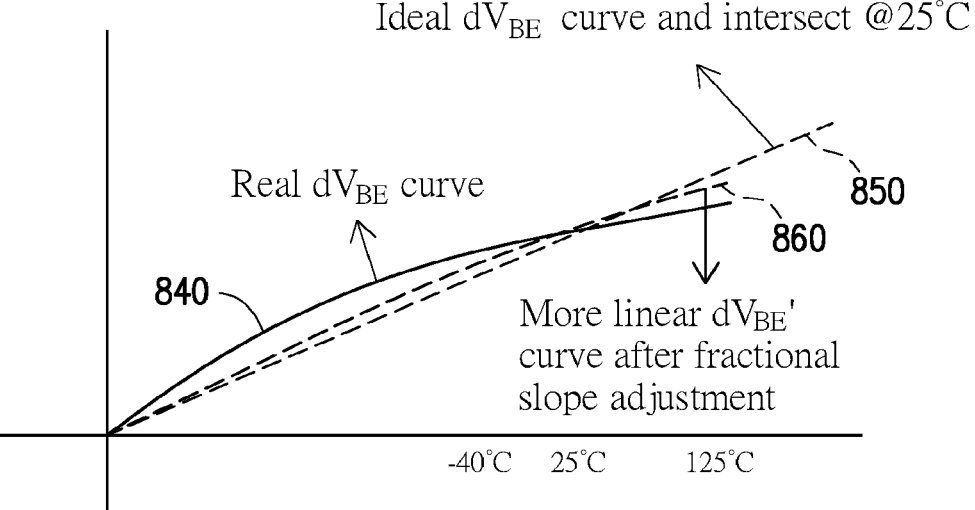
FIG. 8B illustrates differential-voltage-temperature relationship for the thermal sensor having the voltage-temperature relationships shown in FIG. 8A.

As shown in FIG. 8A, each transistor in a BJT pair, such as the BJT pair (110) shown in FIG. 1A, generates a temperature-dependent $V_{BE}$. Thus, for example, the voltage, $V_{BE1}$, at the emitter of the diode-connected transistor (124) has a $V_{BE}$-temperature curve (810), and the voltage, $V_{BE2}$, at the emitter of the diode-connected transistor (134) has a $V_{BE}$-temperature curve (820). The differential voltage, $dV_{BE}$ (840), as illustrated in FIG. 8B, may deviate significantly from the ideal PTAT temperature dependency (850) except at or near the calibration point (e.g., 25° C.). However, according one aspect of the present disclosure, either one of both of $V_{BE1}$ and $V_{BE2}$ can be adjusted (such as amplified) relative to one another to achieve a more linear $dV_{BE}$. For example, in one embodiment, $V_{BE1}$ is adjusted (e.g., by amplification) relative to $V_{BE2}$ such that the $V_{BE}$-temperature curve (810) is effectively moved (rotated) to an adjusted curve, $V_{BE1}$'–temperature (830). The differential voltage, $dV_{BE}'=V_{BE2}-V_{BE1}'$, has a more linear temperature dependency, as shown by the $dV_{BE}'$–temperature curve (860) in FIG. 8B.

As a specific example, in the BJT pair (120) in FIG. 1A, as discussed above, the differential voltage is given by $$dV_{BE} = V_{BE1} - V_{BE2} = \frac{\eta kT}{q}\ln r,$$

where r is the current density ratio between the two branches. In the case in which the currents through both diode-connected transistors are the same, the current density ratio is inverse of the emitter area ratio, n/m=N. If η is not a constant with temperature, $dV_{BE}$ is not PTAT. However, according to one aspect of the present disclosure, $V_{BE1}$ and $V_{BE2}$ can be amplified differently to make $dV_{BE}$ be closer to PTAT. For example, $V_{BE1}$ is amplified by a factor $C_s$. The differential voltage $dV_{BE}=C_s V_{BE1}-V_{BE}$ can be made more PTAT by appropriate choice of $C_s$.

Specifically, the current $I_1$ through the diode-connected transistor (124) in the first branch (120) is $$I_1 = I_s e^{\frac{qV_{BE1}}{\eta kT}}$$

where, $I_s$ is a process-dependent saturation current; the current $I_2$ through the diode-connected transistor (134) in the second branch (130) is $$I_2 = N \cdot I_s e^{\frac{qV_{BE2}}{\eta kT}}.$$

Amplifying $V_{BE1}$ by $C_s$ is equivalent to having a current $I_1^{Cs}$:

$$I_1^{Cs} = I_s^{Cs} e^{\frac{qC_s V_{BE1}}{\eta kT}}.$$

Thus, $$\frac{I_1^{C_s}}{I_2} = \frac{I_s^{C_s-1}}{N} e^{\frac{q(C_s V_{BE1} - V_{BE2})}{\eta kT}},$$

and the differential voltage is $$dV_{BE} = C_s V_{BE1} - V_{BE2} = \ln \frac{N I_1^{C_s}}{I_2 I_s^{C_s-1}} \cdot \frac{\eta k}{q} \cdot T.$$

For the case where $I_1 = I_2 = I$, $$dV_{BE} = \ln\left[N\left(\frac{I}{I_s}\right)^{C_s-1}\right] \cdot \frac{\eta k}{q} \cdot T = C''' T,$$

where C''', the coefficient (or "slope") in the $dV_{BE}$-T relationship, is $$C''' = \ln\left[N\left(\frac{I}{I_s}\right)^{C_s-1}\right] \cdot \frac{\eta k}{q}.$$

Thus, the coefficient is modified from ln $$N \cdot \frac{\eta k}{q}$$

(i.e., $C_s = 1$) for $dV_{BE} = V_{BE1} - V_{BE2}$ to ln $$\left[N\left(\frac{I}{I_s}\right)^{C_s-1}\right] \cdot \frac{\eta k}{q}$$

for $dV_{BE} = C_s V_{BE1} - V_{BE2}$. By appropriate choices of $C_s$ and I (or $I_1$ and $I_2$), the introduction of the factor $$\left(\frac{I}{I_s}\right)^{C_s-1}$$

can serve to compensate for the temperature dependency of the ideality factor, n, such that the coefficient, C''', as a whole is less temperature dependent than $\eta$, and $dV_{BE}$ is more PTAT, especially in the temperature range of intended operation.

More generally, $V_{BE1}$ and $V_{BE2}$ can be treated differently from each other in other ways than by simple amplification. For example, amplifiers for $V_{BE1}$ and $V_{BE2}$ can be configured such that $C_s$ is a temperature-dependent factor instead of a constant.

Figure 9:
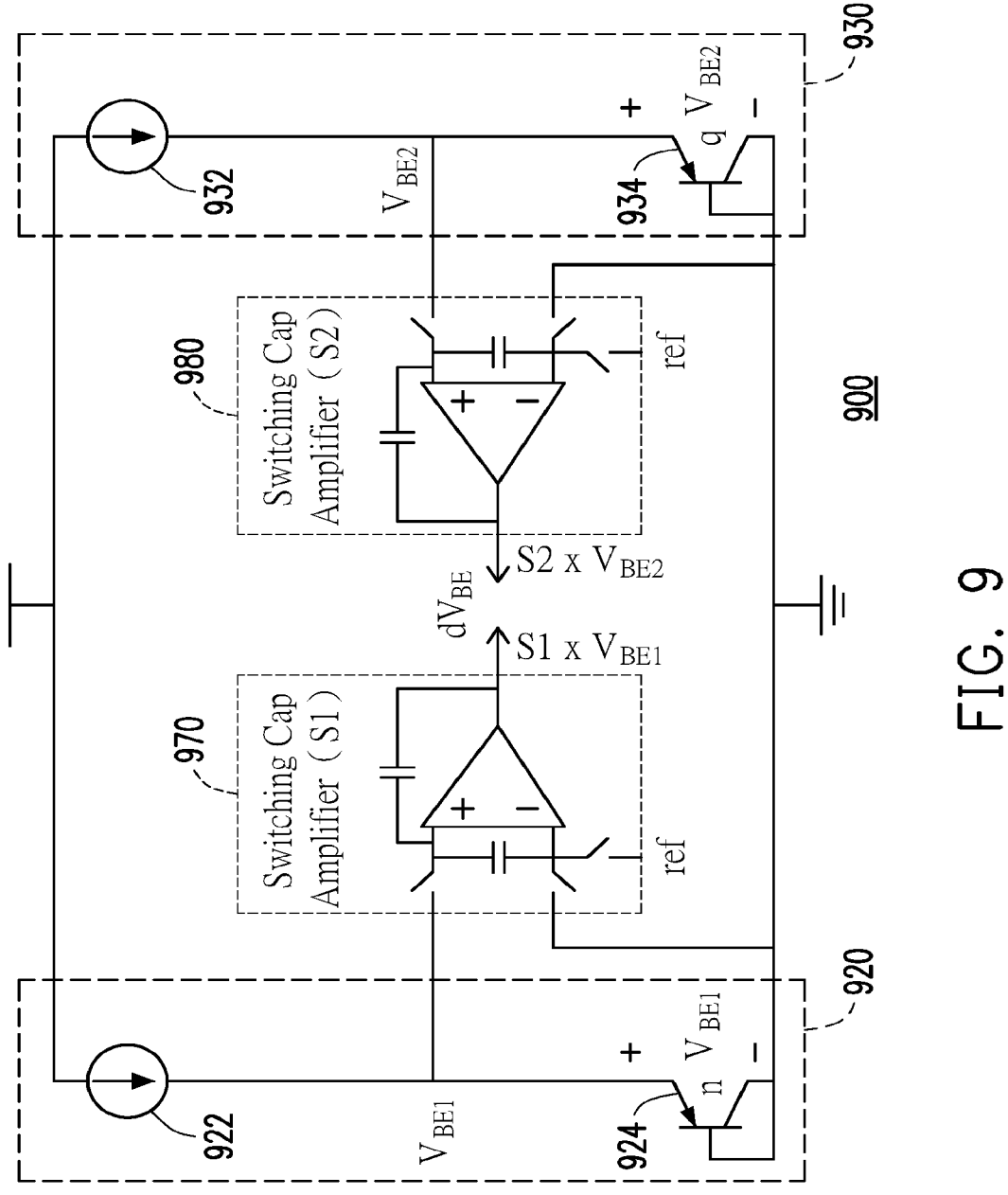
FIG. 9 schematically illustrates a discrete-timing-type thermal sensor circuit with fractional slope adjustment according to one aspect of the present disclosure.

The linearization of the $dV_{BE}$-T relationship outlined above can be implemented by a variety of circuits. For example, as shown in FIG. 9, discrete-timing type circuits, such as those shown in FIG. 3, can be used to amplify $V_{BE1}$ and $V_{BE2}$ differently. In this example, the thermal sensor (900) includes two BJT branches (920, 930). The first branch (920) includes a first current source (922) and first diode-connected transistor (924); the second branch (930) includes a second current source (932) and second diode-connected transistor (934). A signal processing circuit in this example includes a pair of switched-capacitor amplifiers (970, 980) of the same types as the switched-capacitor amplifiers (310, 340) shown in FIG. 3. The amplifiers (970, 980) are connected to receive as inputs emitter voltages $V_{BE1}$ and $V_{BE2}$ from the respective branches (920, 930). The amplifiers (970, 980) have different gains, $S_1$ and $S_2$, respectively. The outputs of the amplifiers (970, 980) provides the differential signal, $V_{BE}$. $S_1$ and $S_2$ can be chosen to produce a $dV_{BE}$ that is satisfactorily PTAT within the intended operational temperature range, e.g., from about −40° C. to about 125° C.

Figure 10:
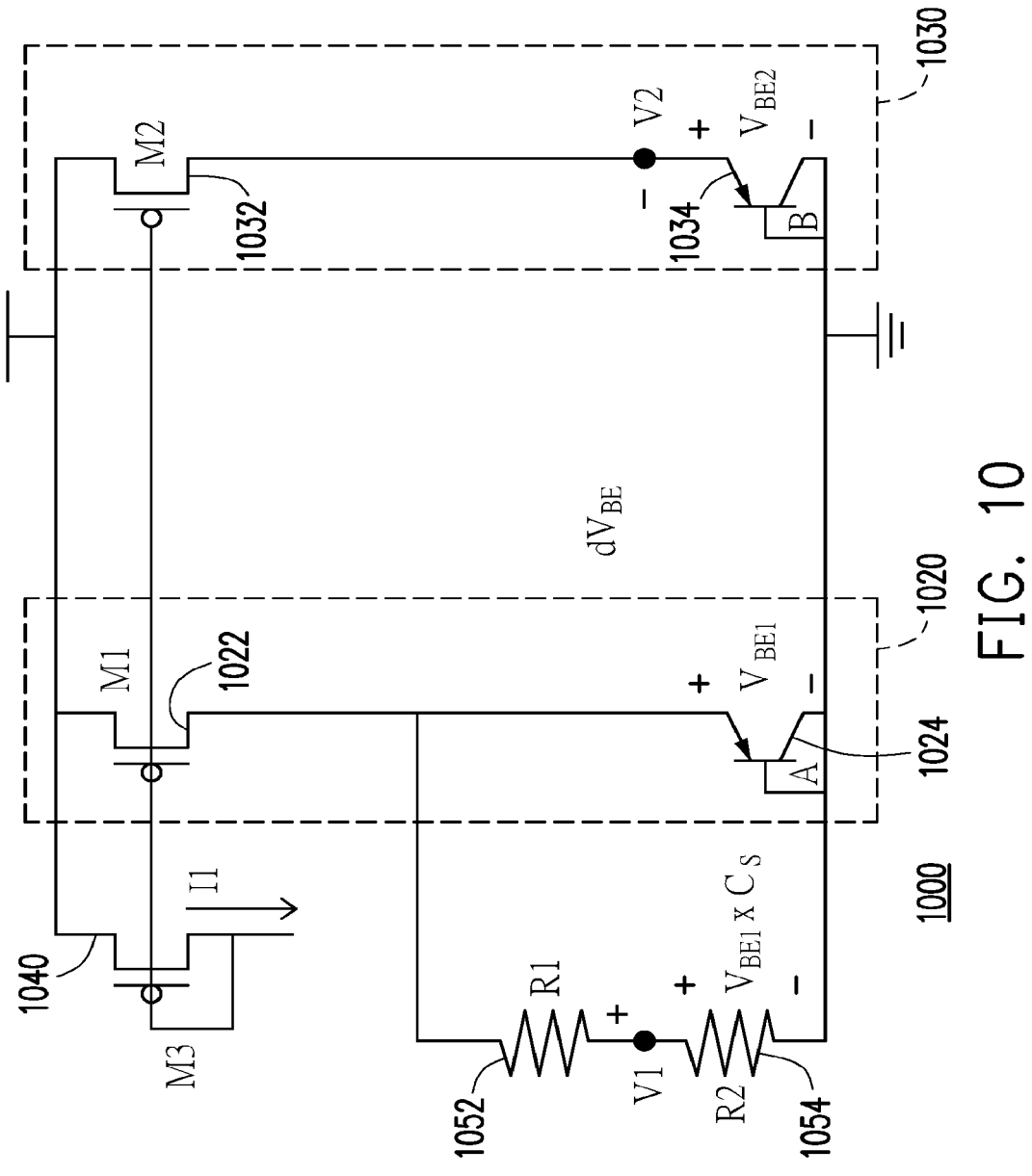
FIG. 10 schematically illustrates a continuous-DC-type thermal sensor circuit with resistor-ratio fractional slope adjustment according to one aspect of the present disclosure.

In another embodiment, as shown in FIG. 10, a continues-DC type thermal sensor (1000) includes two BJT branches (1020, 1030). The first branch (1020) includes a first current source, which in this example is a MOSFET M1 (1022), and first diode-connected transistor (1024); the second branch (1030) includes a second current source, which in this example is a MOSFET M2 (1032), and second diode-connected transistor (1034). M1 and M2 form current mirrors with another transistor, which in this example is a MOSFET M3 (1040), and supply the same current as the current, $I_1$, through M3. The emitter voltage, $V_{BE1}$, of the first transistor (1024) is applied to an amplifier, which in this example is a voltage divider consisting of serially connected resistors R1 (1052) and R2 (1054) and has a gain of $C_s = R1/(R1+R2)$. The output voltage, $V_1$, of the first branch (1020) is taken at the junction between R1 and R2. The output voltage, $V_2$, of the second branch (1030) is taken at the emitter of the second transistor (1034), i.e., $V_2 = V_{BE2}$. The differential output voltage of the thermal sensor (1000) is $dV_{BE} = V_1 - V_2$.

Figure 11:
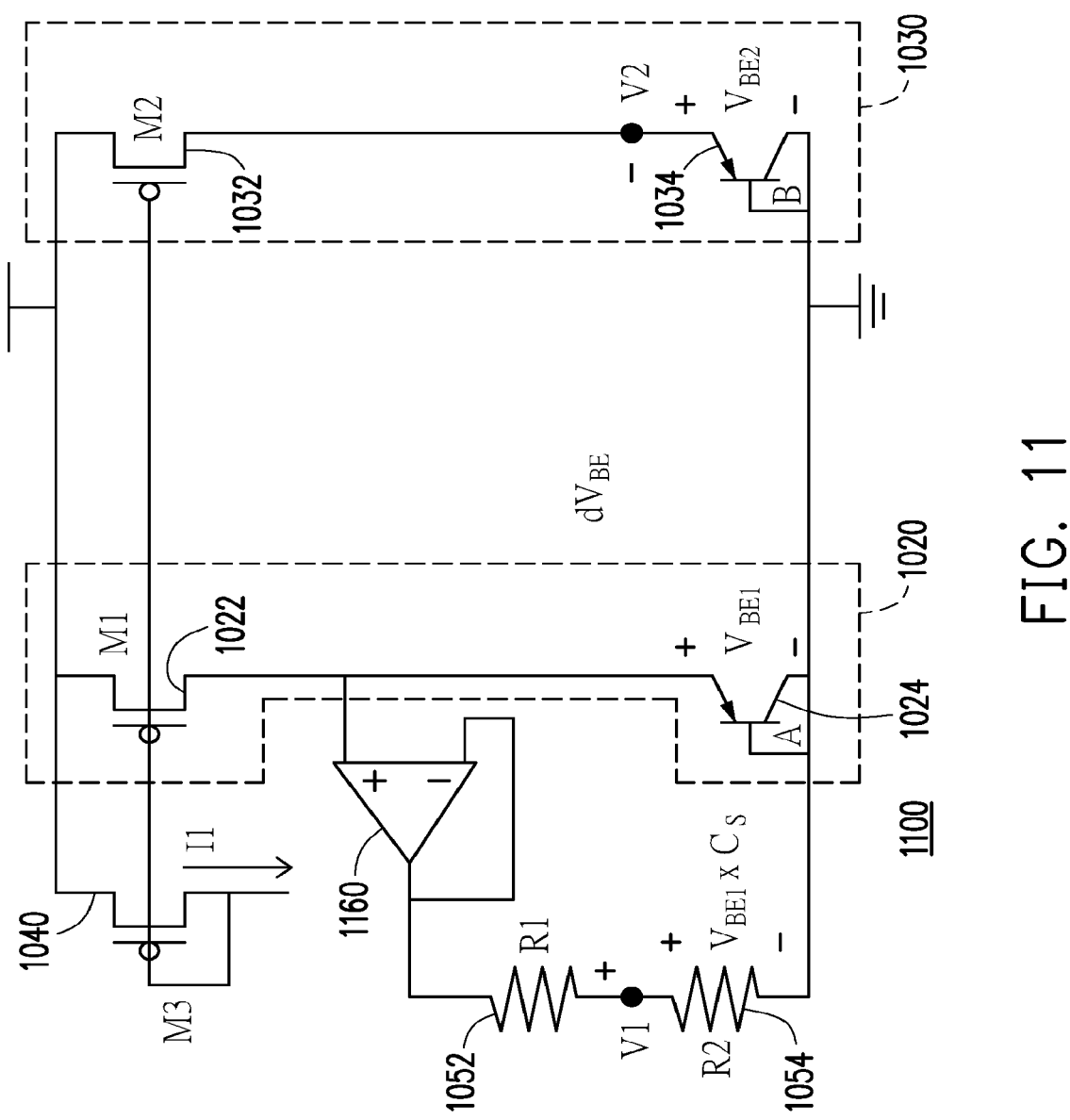
FIG. 11 schematically illustrates a continuous-DC-type thermal sensor circuit with resistor-ratio and op-amp-driver fractional slope adjustment according to one aspect of the present disclosure.

In another embodiment, as shown in FIG. 11, a continuous-DC type thermal sensor (1100) is otherwise identical to the sensor (1000) in FIG. 10, except that a driver (voltage follower) (1160) is used to supply $V_{BE1}$ to the voltage divider formed by the serially connected resistors R1 (1052) and R2 (1054).

Figure 12:
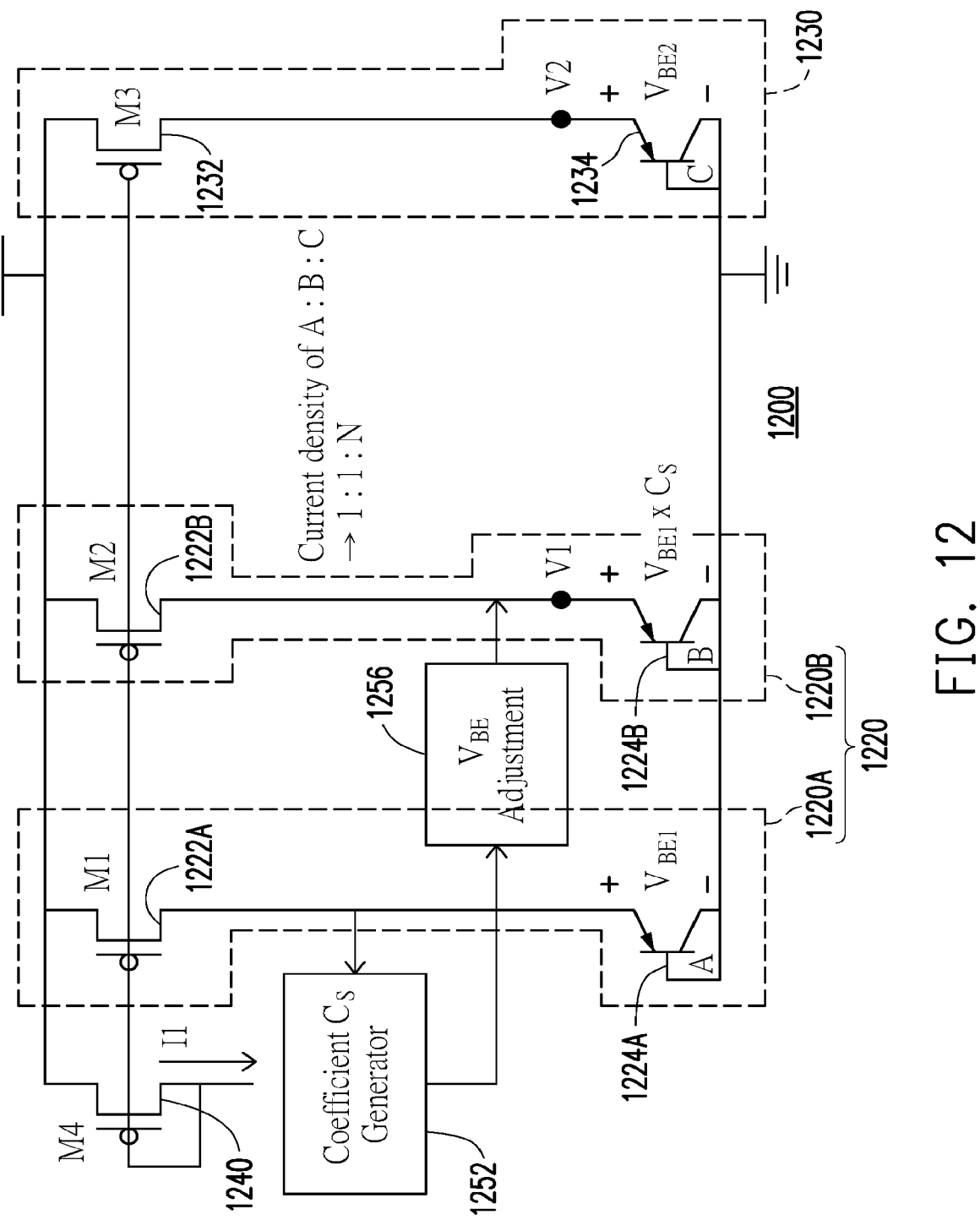
FIG. 12 schematically illustrates a continuous-DC-type thermal sensor circuit with $V_{be}$ replica fractional slope adjustment according to one aspect of the present disclosure.

In another embodiment, as shown in FIG. 12, a continuous-DC type thermal sensor (1200) is similar to the thermal sensors (1000, 1100) shown in FIGS. 10 and 11, except that the first branch (1220) includes two sub-branches (1220A, 1220B). The sub-branches (1220A, 1220B) each include a first current source, which in this example is a MOSFET M1 or M2 (1222A, 1222B), and first diode-connected transistor (1224A, 1224B); the second branch (1230) includes a second current source, which in this example is a MOSFET M3 (1232), and second diode-connected transistor (1234). M1, M2 and M3 form current mirrors with another transistor, which in this example is a MOSFET M4 (1240), and supply the same current as the current, $I_1$, through M4. In this example, the current densities in the first and second sub-branches (1220A, 1220B) are the same but are different from the current density in the second branch (1230). The emitter voltage, $V_{BE1}$, of the first transistor (1224A) is applied to a coefficient ($C_s$) generator, i.e., an amplifier (for example, a voltage divider) (1252). The output of the coefficient generator (1252) is fine-tuned by an $V_{BE}$ Adjustment circuit (1256), which can be an amplifier, such as a variable resistor, which in combination with a resistor in the voltage divider (1252) can adjust the output voltage of the voltage divider. The output voltage, $V_1$, of the $V_{BE}$ Adjustment circuit (1256) is connected to the emitter of the first diode-connected transistor (1224B). The output voltage, $V_2$, of the second branch (1230) is taken at the emitter of the second transistor (1234), i.e., $V_2 = V_{BE2}$. The differential output voltage of the thermal sensor (1200) is $dV_{BE} = V_1 - V_2$.

Figure 13:
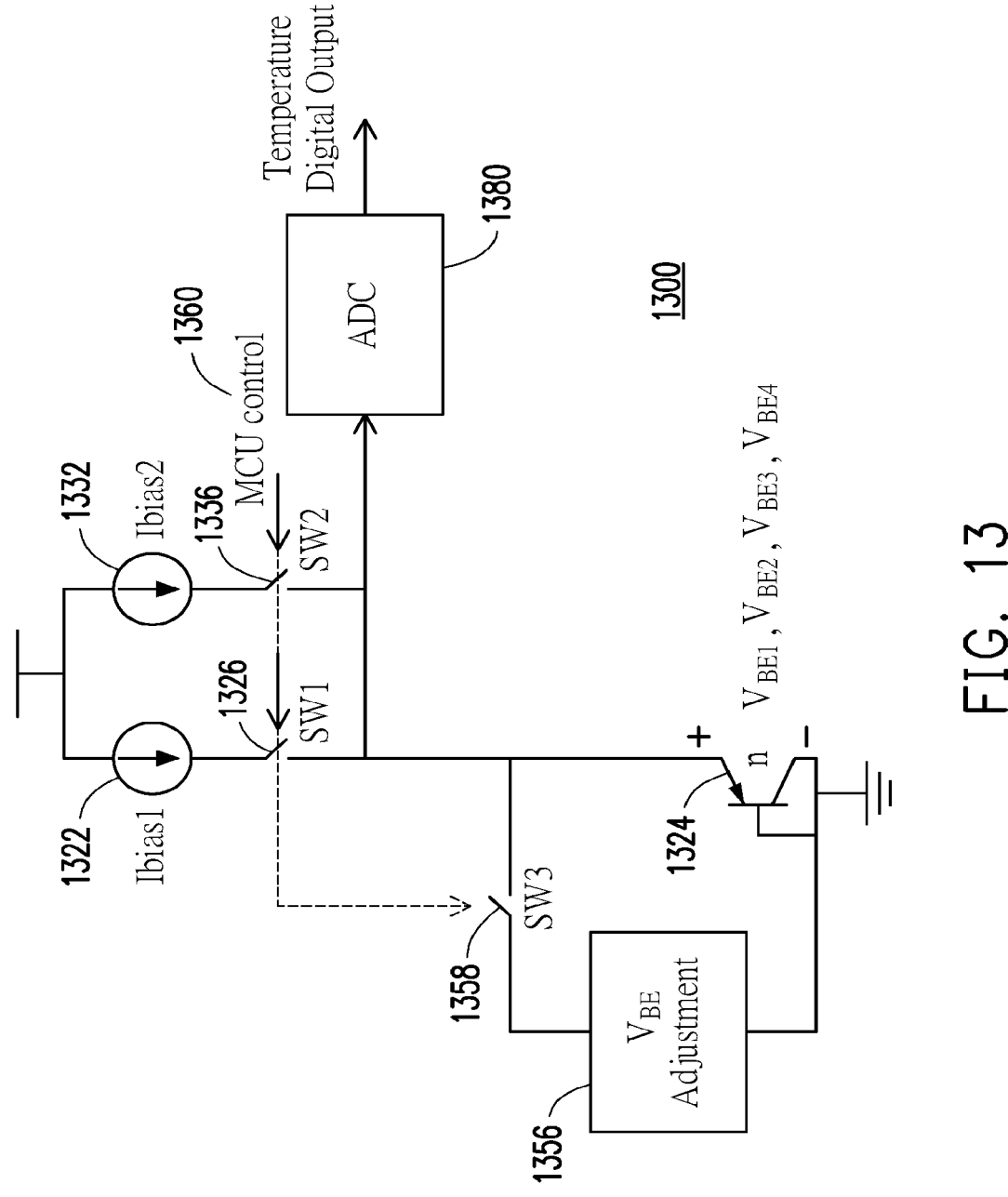
FIG. 13 schematically illustrates a switched single-transistor-branch thermal sensor circuit with fractional slope adjustment controlled by a digital control unit (e.g., micro-controller ("MCU")) according to one aspect of the present disclosure.

In another embodiment, as shown in FIG. 13, in a thermal sensor (1300) according to an aspect of the present disclosure, a single diode-connected transistor (1324) is used to alternately generate $V_{BE}$'s under different bias currents, and the alternately generated $V_{BE}$'s are combined to generate a signal that is substantially PTAT.

In this embodiment, two current sources (1322, 1332) are connected to the emitter of the diode-connected transistor (1324) via respective switches (e.g., switching transistors) SW1 and SW2 (1326, 1336). The current sources (1322, 1332) supplies different current levels to the diode-connected transistor (1324). A $V_{BE}$ adjustment circuit (1356) is connected across the diode-connected transistor (1324) through a switch (e.g., switching transistor) SW3 (1358). The switches SW1, SW2 and SW3 (1326, 1336, 1358) are operated by a control signal (1360) from a processing unit (not shown), such as a microcontroller unit ("MCU"). The emitter voltage of the diode-connected transistor (1324) is input into an analog-to-digital converter ("ADC"); the output of the ADC is connected to a possessor, which can be the processing unit or a separate processing unit.

In operation according to one embodiment, the processing unit outputs a control signal (1360) to alternately turn SW1 and SW2 on to alternately supply two different currents to the diode-connected transistor (1324). The processing unit outputs a control signal (1360) to turn SW3 on while SW1 is turned on or while SW2 is turned on. Thus, depending on the control signal (1360), four $V_{BE}$'s can be generated that can be used to produce a substantially PTAT temperature signal: $V_{BE1}$ is the emitter voltage generated by the first current source (1322) without $V_{BE}$ adjustment; $V_{BE2}$ is the emitter voltage generated by the second current source (1332) without $V_{BE}$ adjustment; $V_{BE3}$ is the emitter voltage generated by the first current source (1322) with $V_{BE}$ adjustment; and $V_{BE4}$ is the emitter voltage generated by the second current source (1332) with $V_{BE}$ adjustment. A processor (not shown) receiving from the ADC (1380) the digital representations of $V_{BE2}$ and $V_{BE3}$ can compute $dV_{BE}=V_{BE3}-V_{BE2}$ which, with an appropriate setting of the $V_{BE}$ adjustment circuit, is substantially PTAT. Alternatively, the processor can receive from the ADC (1380) the digital representations of $V_{BE1}$ and $V_{BE4}$ and compute $dV_{BE}=V_{BE4}-V_{BE1}$ which, with an appropriate setting of the $V_{BE}$ adjustment circuit, is substantially PTAT. The switch combinations and corresponding $dV_{BE}$ obtained are summarized in the table below:

| SW1 | SW2 | SW3 | $V_{BE}$ | $dV_{BE}$ |
|-----|-----|-----|----------|-----------|
| On | Off | On | $V_{BE3}$ | $V_{BE3} - V_{BE2}$ |
| Off | On | Off | $V_{BE2}$ | |
| On | Off | Off | $V_{BE1}$ | $V_{BE4} - V_{BE1}$ |
| Off | On | On | $V_{BE4}$ | |

Figure 14:
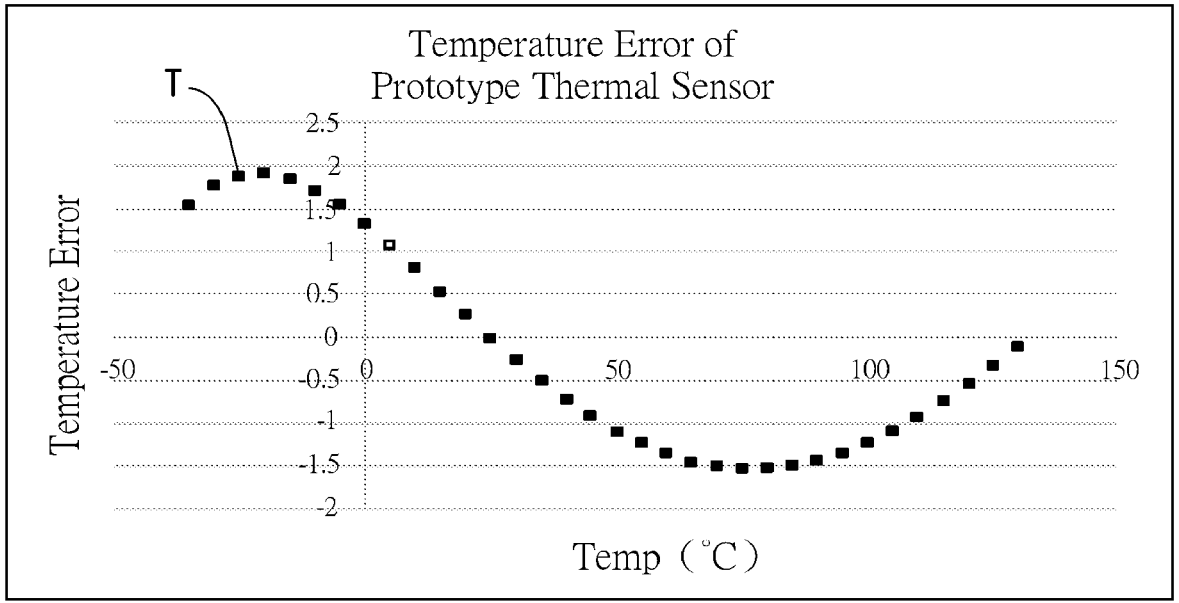
FIG. 14 shows temperature performance data at a process corner for prototype thermal sensors of the type shown in FIG. 11.

FIG. 14 shows the temperature error over a temperature range from −40° C. to 125° C. at the TT process corner of a prototype thermal sensor of FIG. 11, with a single-point calibration at 25° C. As can be seen, the temperature error is within 2° C.

Figure 15:
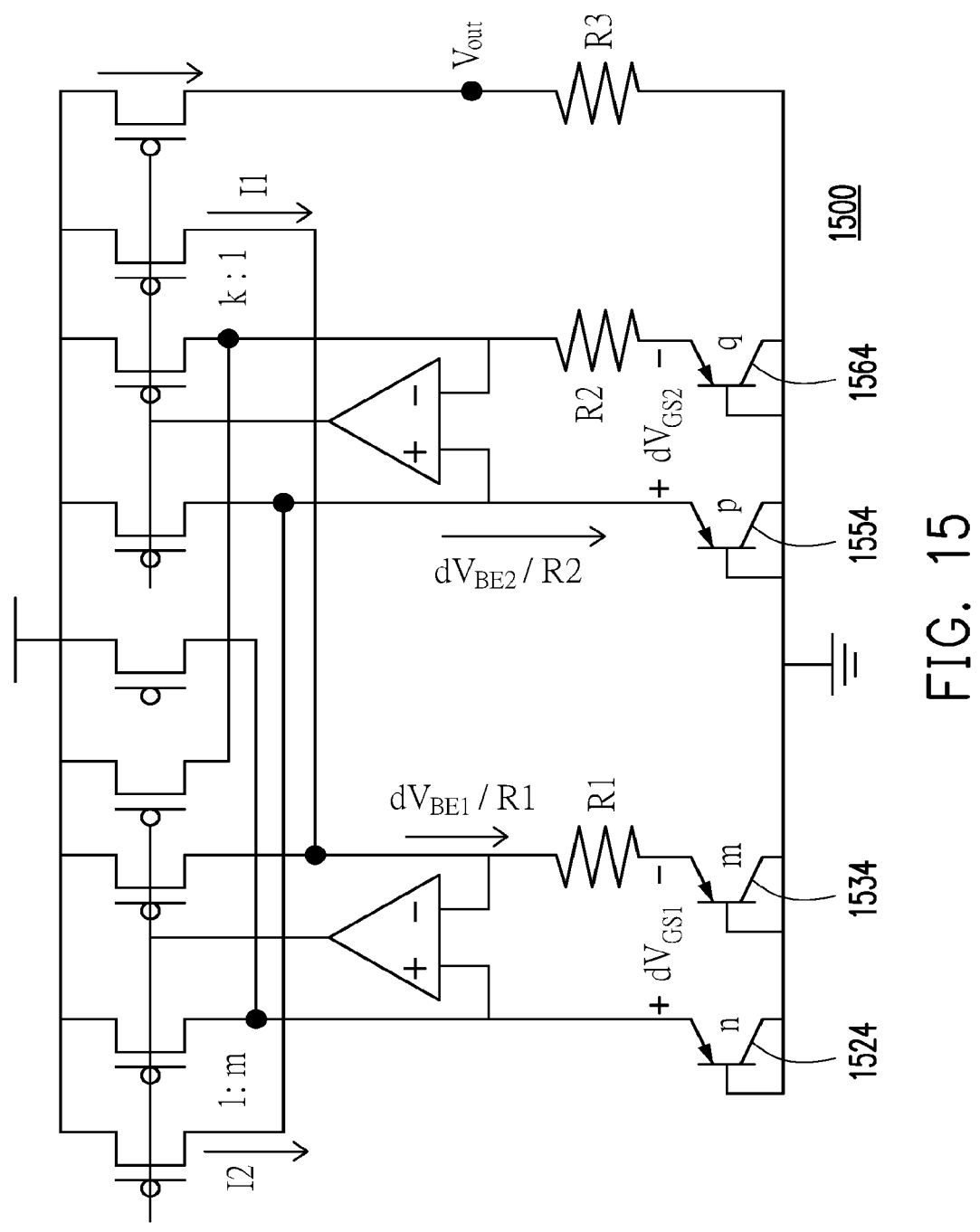
FIG. 15 schematically illustrates a continuous-DC-type thermal sensor circuit with differential feedback, similar to the circuit shown in FIG. 5, but with the bipolar-junction transistors replaced with field-effect transistors, according to one aspect of the present disclosure.

While BJTs are used to generate temperature-dependent voltages in many of the thermal sensors described above, other devices having temperature-dependent outputs can be used. For example, any bandgap thermal sensing device can be used. As an example, in some embodiments, diodes are used instead of BJT transistors. In other examples, field-effect transistors (FET's), such as MOSFET's, can be used instead of BJTs in all thermal sensors illustrated in FIGS. 1A, 3-6 and 9-13. More specifically, FETs operating in subthreshold conditions can be used. In a more specific example, as shown in FIG. 15, a thermal sensor (1500) is essentially the same as the one (500) illustrated in FIG. 5; the difference is that the diode-connected BJTs (524, 534, 554, 564) in the sensor (500) in FIG. 5 are replaced with diode-connected MOSFETs (1524, 1534, 1554, 1564), operating under subthreshold conditions, in the sensor (1500) in FIG. 15.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A thermal sensor, comprising:
a temperature-sensitive device comprising a bandgap thermal-sensing device;
a first current source adapted to generate a current of a first value;
a second current source adapted to generate a current of a second value different from the first value;
a first switching device (SW1) adapted to pass the current generated by the first current source through the bandgap thermal-sensing device;
a second switching device (SW2) adapted to pass the current generated by the second current source through the bandgap thermal-sensing device;
the bandgap thermal-sensing device being adapted to generate a first and a second output signals responsive to temperature and the current of the first and second values, respectively;
a third switching device (SW3);
a gain circuit operatively connectable in parallel to the bandgap thermal-sensing device through the third switch and adapted to adjust the first or second output signal when connected to the bandgap thermal-sensing device; and
a signal processing circuit operatively connected to receive the first and second output signals, and to generate an output signal based on the first and second output signals.

2. The thermal sensor of claim 1, wherein one of the first and second output signals is a signal generated by the bandgap thermal-sensing device while being connected to the gain circuit, wherein the output signal of the signal processing circuit is a linear combination between the first and second signals.

3. The thermal sensor of claim 2, wherein the output signal of the signal processing circuit is a differential signal between the first and second signals.

4. The thermal sensor of claim 1, wherein the first, second, and third switching devices are adapted to be actuated cooperatively to alternately connect the first and current sources to the bandgap thermal-sensing device, and connect the gain circuit to the bandgap thermal-sensing device when one of the first and second current sources is connected to the bandgap thermal-sensing device and disconnect the gain circuit from the bandgap thermal-sensing device when the other one of the first and second current sources is connected to the bandgap thermal-sensing device.

5. The thermal sensor of claim 4, wherein the bandgap thermal-sensing device is adapted to generate a voltage dependent on a combination of a state of connection between the bandgap thermal-sensing device with the first and second current sources and with the gain circuit.

6. The thermal sensor of claim 5, wherein the bandgap thermal-sensing device comprises a bipolar-junction transistor having a gate, an emitter and a collector, wherein the voltage generated by the bandgap thermal-sensing device is base-to-emitter voltage ($V_{BE}$).

7. The thermal sensor of claim 6, wherein the output of the signal processing circuit is indicative of a differential voltage, $dV_{BE}$, given by one of the expressions for $dV_{BE}$ in the following table:

| SW1 | SW2 | SW3 | $V_{BE}$ | $dV_{BE}$ |
|---|---|---|---|---|
| On | Off | On | $V_{BE3}$ | $V_{BE3} - V_{BE2}$ |
| Off | On | Off | $V_{BE2}$ | |
| On | Off | Off | $V_{BE1}$ | $V_{BE4} - V_{BE1}$. |
| Off | On | On | $V_{BE4}$ | |

8. The thermal sensor of claim 6, wherein the first and second current sources and bipolar-junction transistor are configured to generate a current density in the bipolar-junction transistor, and wherein the current densities are different for the first and second current sources.

9. The thermal sensor of claim 1, wherein the signal processing circuit comprises an analog-to-digital converter (ADC) adapted to receive the output signals from the bandgap thermal-sensing device.

10. The thermal sensor of claim 1, wherein the output signal generated by the signal processing circuit is substantially proportional to absolute temperature at the thermal sensor in a temperature range from −50° C. to 150° C.

11. The thermal sensor of claim 10, wherein each temperature corresponding to the output signal generated by the signal processing circuit within the temperature range differs by no more than 5° C. from a temperature determined by proportional relationship between absolute temperature and output signal generated by the signal processing circuit.

12. The thermal sensor of claim 1, wherein, the bandgap thermal-sensing devices comprises a field-effect transistor, wherein the first and second current sources and field-effect transistor are configured to generate a current density in the field-effect transistor, and wherein the current densities are different for the first and second current sources.

* * * * *